US006985538B2

(12) United States Patent  
Murakami et al.

(10) Patent No.: US 6,985,538 B2  
(45) Date of Patent: Jan. 10, 2006

(54) DIGITAL RADIO COMMUNICATION SYSTEM AND METHOD

(75) Inventors: Yutaka Murakami, Yokohama (JP); Shinichiro Takabayashi, Kawasaki (JP); Katsuaki Abe, Kawasaki (JP); Masayuki Orihashi, Ichikawa (JP); Akihiko Matsuoka, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 841 days.

(21) Appl. No.: 09/789,623

(22) Filed: Feb. 22, 2001

(65) Prior Publication Data

US 2001/0017896 A1    Aug. 30, 2001

(30) Foreign Application Priority Data

Feb. 25, 2000  (JP) .............................. 2000-048856  
Oct. 20, 2000  (JP) .............................. 2000-320627

(51) Int. Cl.  
*H04L 27/10* (2006.01)

(52) U.S. Cl. ..................... 375/280; 375/224; 375/219; 375/261; 375/268; 375/298; 370/252

(58) Field of Classification Search ................ 375/219, 375/224, 227, 259, 260, 256, 286, 295, 316, 375/261, 281, 279, 298, 332, 308, 268, 300, 375/329; 370/206, 204, 203; 332/103, 149, 332/144

See application file for complete search history.

(56) References Cited

U.S. PATENT DOCUMENTS

| | | | |
|---|---|---|---|
| 4,763,357 A * | 8/1988 | Barr ........................... 380/266 |
| 5,533,004 A * | 7/1996 | Jasper et al. ................. 370/204 |
| 5,764,699 A * | 6/1998 | Needham et al. ........... 375/261 |
| 5,909,469 A * | 6/1999 | Frodigh et al. ............. 375/302 |
| 6,038,450 A * | 3/2000 | Brink et al. ................. 455/442 |
| 6,167,031 A * | 12/2000 | Olofsson et al. ............. 370/252 |
| 6,188,720 B1 * | 2/2001 | Batzer et al. ................ 375/222 |
| 6,212,240 B1 * | 4/2001 | Scheibel et al. ............. 375/261 |
| 6,359,934 B1 * | 3/2002 | Yoshida ...................... 375/262 |
| 6,389,066 B1 * | 5/2002 | Ejzak ........................... 375/224 |
| 6,407,993 B1 * | 6/2002 | Moulsley ..................... 370/347 |
| 6,519,279 B1 * | 2/2003 | Abdesselem et al. ........ 375/219 |
| 6,587,510 B1 * | 7/2003 | Minami et al. ............. 375/285 |
| 6,636,500 B2 * | 10/2003 | Krishnamoorthy et al. . 370/347 |

(Continued)

OTHER PUBLICATIONS

Article entitled "Performance Analysis of Adaptive Modulation Systems Using Square-QAM", by S. Otsuki et al., Technical Report of The Institute of Electronics, Information and Communication Engineers RCS94-66, Sep. 1994, with English language Abstract.

*Primary Examiner*—Jean B. Corrielus  
(74) *Attorney, Agent, or Firm*—Greenblum & Bernstein, P.L.C.

(57) ABSTRACT

QPSK modulated quadrature baseband signal generating section 301 generates a QPSK modulated quadrature baseband signal. 8PSK modulated quadrature baseband signal generating section 302 generates an 8PSK modulated quadrature baseband signal. Based on the modulation scheme determined information, in-phase component switching section 304 and quadrature component switching section 305 switch between the QPSK modulated quadrature baseband signal, 8PSK modulated quadrature baseband signal and pilot symbol to output to radio section 306. Radio section 306 performs the predetermined radio processing on the baseband signal to output a transmission signal. The transmission signal is amplified in power amplifier 307, and the amplified transmission signal is transmitted from transmission antenna 309. It is thereby possible to take into account both the improvement in the data transmission rate, and the benefit and convenience in terminals.

3 Claims, 21 Drawing Sheets

U.S. PATENT DOCUMENTS 6,717,934 B1 * 4/2004 Kaasila et al. .............. 370/347

2002/0051424 A1 * 5/2002 Krishnamoorthy et al. . 370/204

* cited by examiner

DIGITAL RADIO COMMUNICATION SYSTEM AND METHOD

BACKGROUND OF THE INVENTION

1. Field of the Invention

The present invention relates to a digital radio communication system and method for switching a modulation scheme corresponding to a propagation environment, while using different modulation schemes between uplink and downlink channels.

2. Description of the Related Art

In a digital radio communication, a data transmission rate is increased as the modulation level of a modulation scheme is increased, however, using the multilevel modulation scheme in a poor propagation environment increases errors and degrades the signal quality.

As a method for improving both of the data transmission rate and quality, there is known a technique described in Technical Report of IEICE, RCS94-66. The technique switches modulation schemes such as QPSK, 16QAM, 64QAM, 256QAM and the like corresponding to a propagation environment.

In a digital radio communication system in which a base station performs radio communications with terminals, it is desired to improve a transmission rate on downlink used for the base station to transmit data to terminals, while when the benefit and convenience in the terminals are taken into account, reducing the scale and power consumption in the terminals is more desired than improving the transmission rate on uplink used for the terminals to transmit data to the base station.

Generally, as the modulation level of a modulation scheme is increased, power consumption in a power amplifier used to transmit signals is increased to obtain a predetermined quality. Therefore, in constructing a digital radio communication system, it is necessary to consider both of an improvement in the data transmission rate and the benefit and convenience in terminals.

However, at present, there exists no digital radio communication system that switches modulation schemes taking the benefit and convenience in terminals into account.

SUMMARY OF THE INVENTION

It is an object of the present invention to provide a digital radio communication system and method that take into account both of an improvement in the data transmission rate and the benefit and convenience in terminals.

This object is achieved by switching modulation schemes corresponding to a propagation environment, and in using different modulation schemes between uplink and downlink channels, enabling a modulation scheme with a high data transmission rate to be used on downlink while using a phase modulation as a modulation scheme on uplink.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Embodiments of the present invention will be described specifically below with reference to accompanying drawings.

First Embodiment

The first embodiment describes a case of using two types of modulation schemes, namely, QPSK and 16QAM on downlink and of using two types of modulation schemes, namely, QPSK and 8PSK on uplink.

Figure 1:
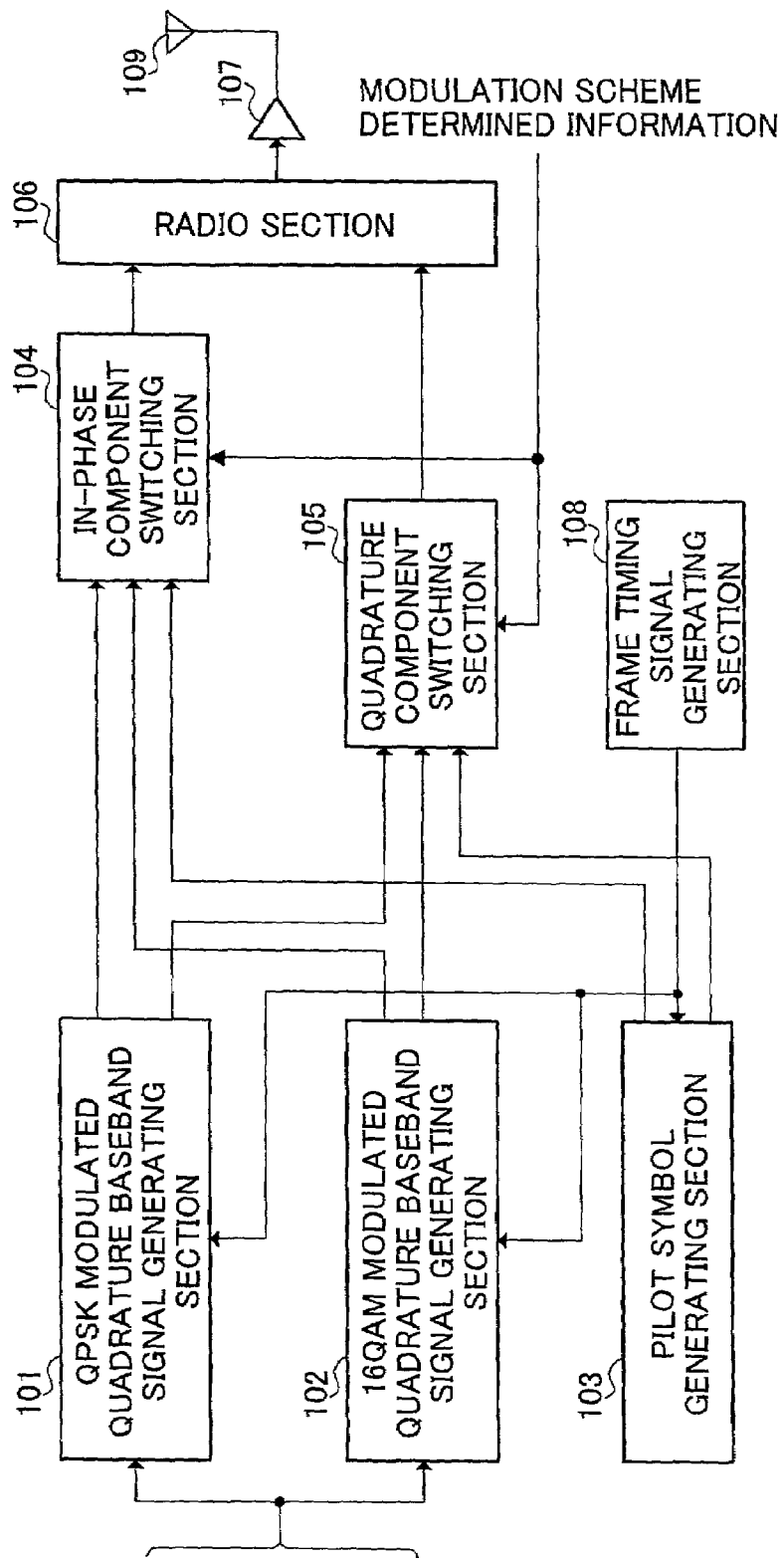
FIG. 1 is a block diagram illustrating a configuration for use in transmitting signals in a base station in a digital radio communication system according to a first embodiment of the present invention.
Figure 2:
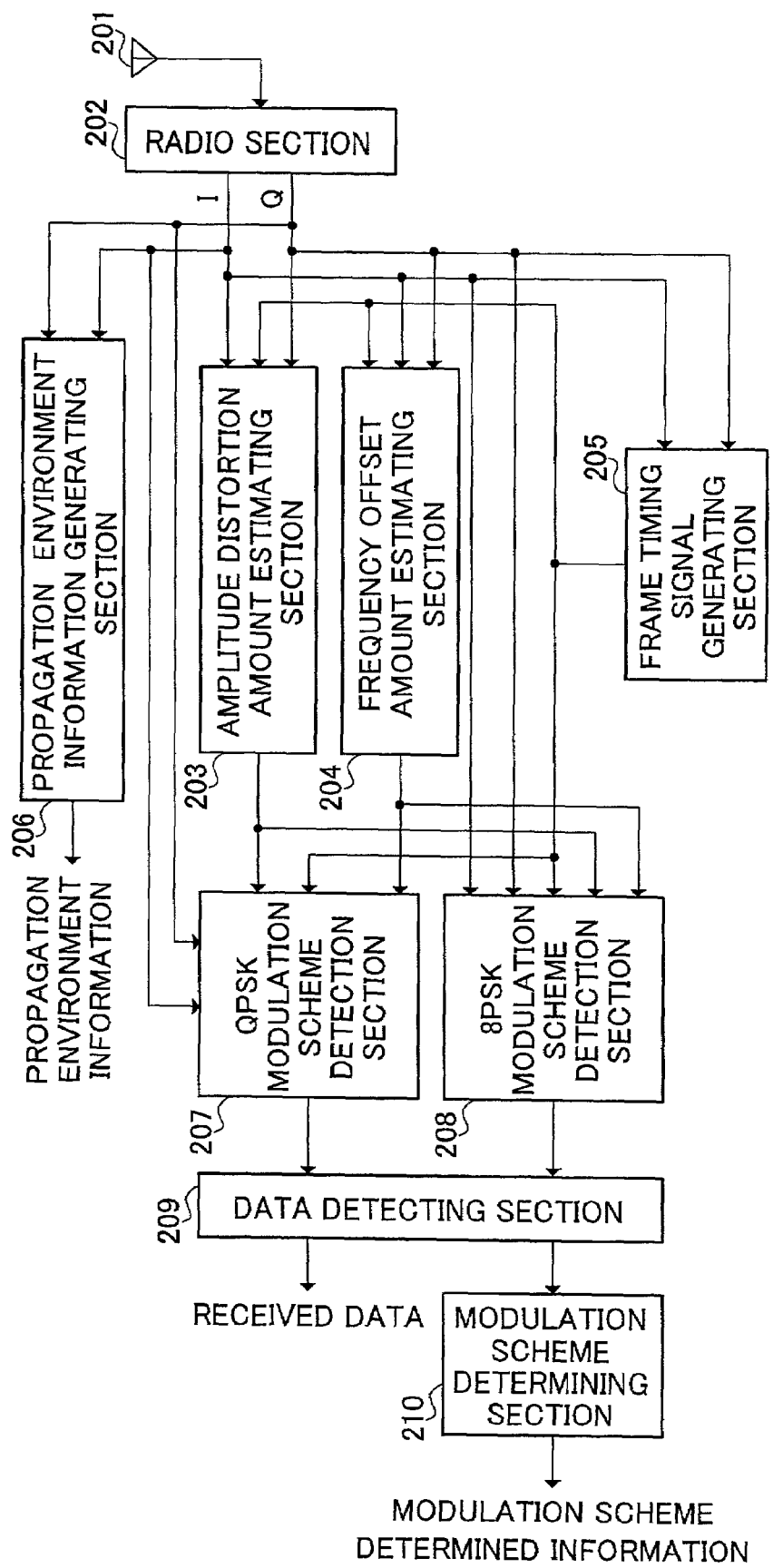
FIG. 2 is a block diagram illustrating a configuration for use in receiving signals in the base station in the digital radio communication system according to the first embodiment of the present invention.
Figure 3:
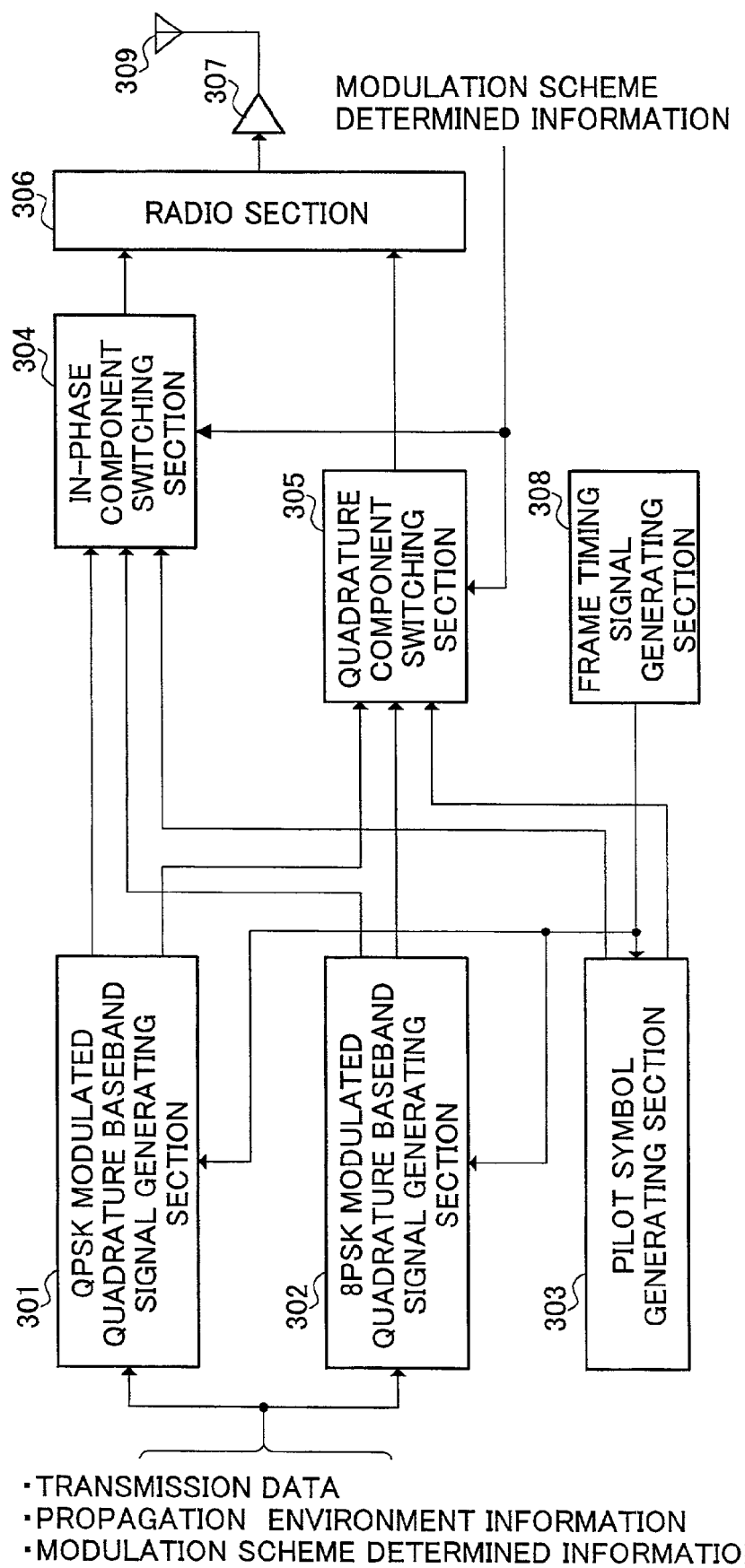
FIG. 3 is a block diagram illustrating a configuration for use in transmitting signals in a terminal in the digital radio communication system according to the first embodiment of the present invention.
Figure 4:
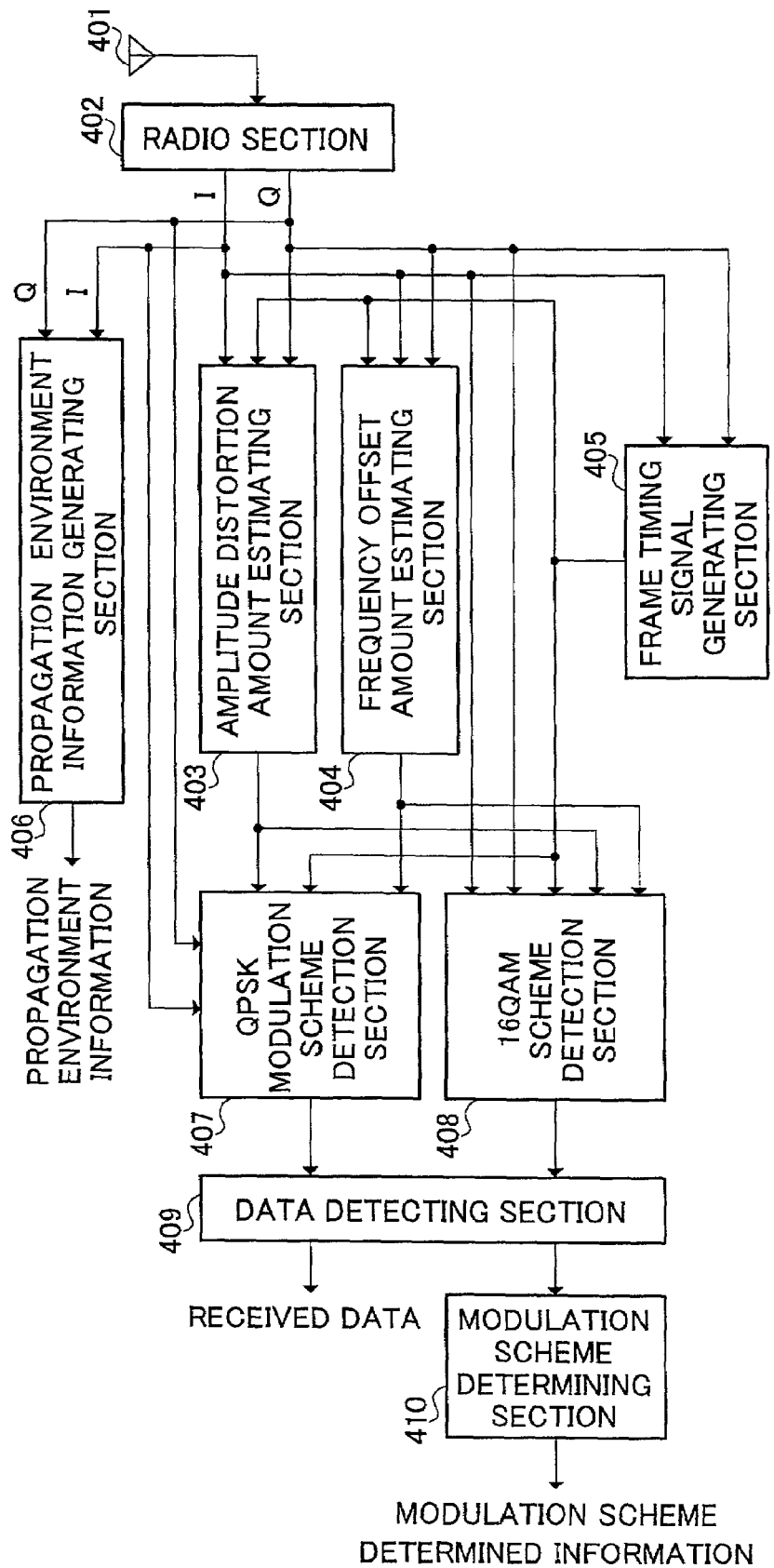
FIG. 4 is a block diagram illustrating a configuration for use in receiving signals in the terminal in the digital radio communication system according to the first embodiment of the present invention.

FIG. 1 is a block diagram illustrating a configuration for use in transmitting signals in a base station in a digital radio communication system according to the first embodiment, and FIG. 2 is a block diagram illustrating a configuration for use in receiving signals in the base station in the digital radio communication system according to the first embodiment. FIG. 3 is a block diagram illustrating a configuration for use in transmitting signals in a terminal in the digital radio communication system according to the first embodiment, and FIG. 4 is a block diagram illustrating a configuration for use in receiving signals in the terminal in the digital radio communication system according to the first embodiment of the present invention.

In the configuration used in transmission in the base station illustrated in FIG. 1, transmission data is output to QPSK modulated quadrature baseband signal generating section 101 and 16QAM modulated quadrature baseband signal generating section 102 along with propagation environment information and modulation scheme determined information. Frame timing signal generating section 108 generates a frame timing signal to output to QPSK modulated quadrature baseband signal generating section 101, 16QAM modulated quadrature baseband signal generating section 102 and pilot symbol generating section 103.

QPSK modulated quadrature baseband signal generating section 101 receives as its inputs the transmission data, the propagation environment information and the modulation scheme determined information, generates a QPSK modulated quadrature baseband signal, and according to the frame timing signal, outputs an in-phase component of the QPSK modulated quadrature baseband signal to in-phase component switching section 104, while outputting a quadrature component of the QPSK modulated quadrature baseband signal to quadrature component switching section 105.

16QAM modulated quadrature baseband signal generating section 102 receives as its inputs the transmission data, the propagation environment information and the modulation scheme determined information, generates a 16QAM modulated quadrature baseband signal according to the frame timing signal, and outputs an in-phase component of the 16QAM modulated quadrature baseband signal to in-phase component switching section 104, while outputting a quadrature component of the 16QAM modulated quadrature baseband signal to quadrature component switching section 105.

Pilot symbol generating section 103 outputs an in-phase component of a pilot symbol to in-phase component switching section 104, while outputting a quadrature component of the pilot symbol to quadrature component switching section 105, according to the frame timing signal.

Based on the modulation scheme determined information, in-phase component switching section 104 switches between the in-phase component of the QPSK modulated quadrature baseband signal, in-phase component of the 16QAM modulated quadrature baseband signal and in-phase component of the pilot symbol to output to radio section 106 as an in-phase component of a transmission quadrature baseband signal.

Based on the modulation scheme determined information, quadrature component switching section 105 switches between the quadrature component of the QPSK modulated quadrature baseband signal, quadrature component of the 16QAM modulated quadrature baseband signal and quadrature component of the pilot symbol to output to radio section 106 as a quadrature component of the transmission quadrature baseband signal.

Radio section 106 receives as its inputs the in-phase component and quadrature component of the transmission quadrature baseband signal, and performs the predetermined radio processing on the baseband signal to output a transmission signal. The transmission signal is amplified in power amplifier 107, and the amplified transmission signal is transmitted from transmission antenna 109.

Figure 5A:
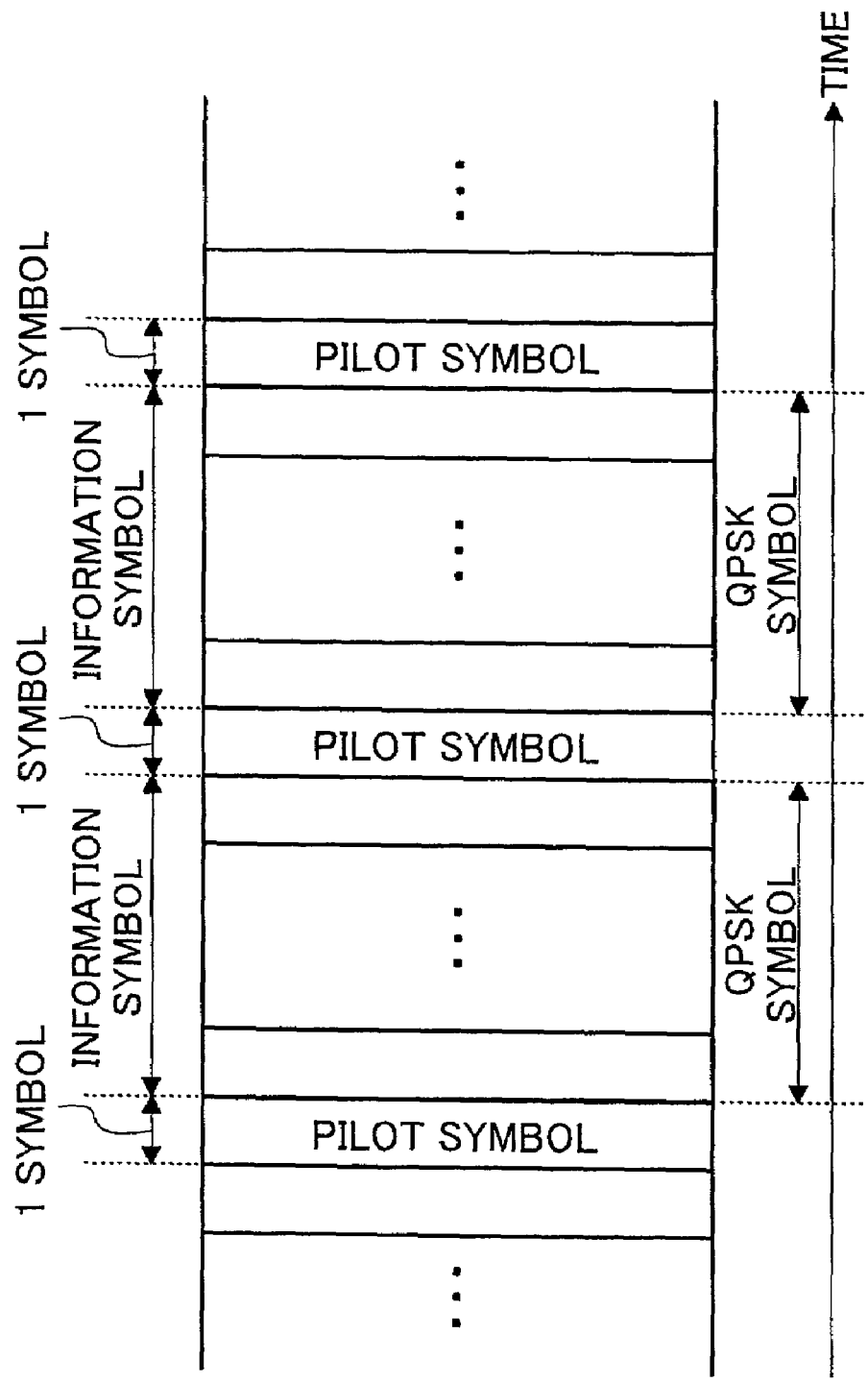
FIG. 5A is a view showing an example of a frame structure on downlink in the digital radio communication system according to the first embodiment of the present invention.
Figure 5B:
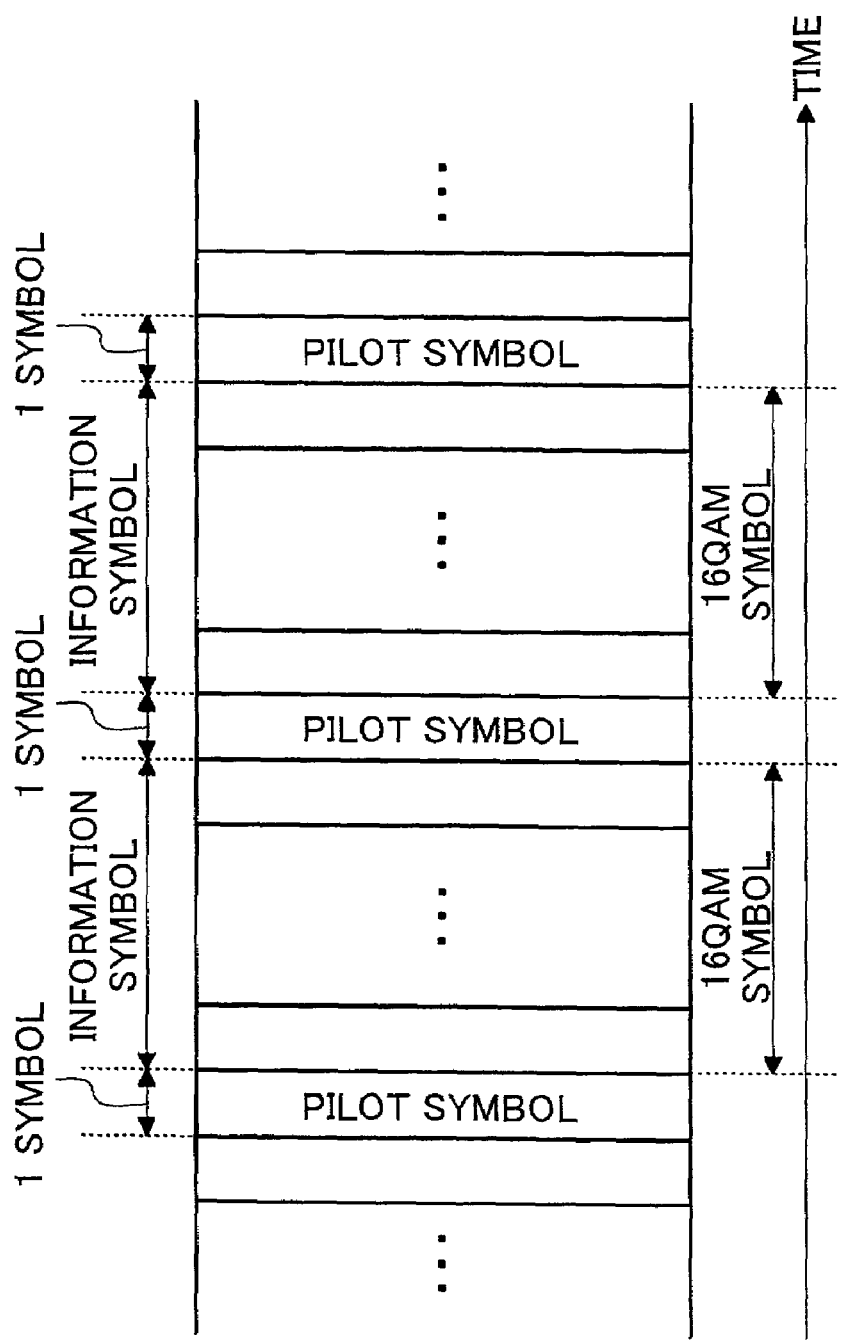
FIG. 5B is a view showing another example of the frame structure on downlink in the digital radio communication system according to the first embodiment of the present invention.

When QPSK is selected as the modulation scheme due to a poor propagation environment, a frame structure on downlink is as illustrated in FIG. 5A. Further, when 16QAM is selected as the modulation scheme due to a good propagation environment, the frame structure on downlink is as illustrated in FIG. 5B.

In the configuration used in reception in the base station illustrated in FIG. 2, radio section 202 performs the predetermined radio processing on a signal received at antenna 201, and outputs an in-phase component and quadrature component of a received quadrature baseband signal.

Frame timing signal generating section 205 receives as its input the received quadrature baseband signal, and generates a frame timing signal to output to amplitude distortion amount estimating section 203, frequency offset amount estimating section 204, QPSK scheme detection section 207 and 8PSK scheme detection section 208.

Amplitude distortion amount estimating section 203 extracts a pilot symbol from the received quadrature baseband signal according to the frame timing signal, estimates an amplitude distortion amount from the in-phase and quadrature components of the pilot symbol, and outputs an amplitude distortion amount estimated signal to QPSK scheme detection section 207 and 8PSK scheme detection section 208.

Frequency offset amount estimating section 204 extracts the pilot symbol from the received quadrature baseband signal according to the frame timing signal, estimates a frequency offset amount from the in-phase and quadrature components of the pilot symbol, and outputs a frequency offset amount estimated signal to QPSK scheme detection section 207 and 8PSK scheme detection section 208.

Propagation environment information generating section 206 estimates a propagation environment based on the received quadrature baseband signal to generate propagation environment information. The propagation environment information generated in propagation environment information generating section 206 is provided to QPSK modulated quadrature baseband signal generating section 101 and 16QAM modulated quadrature baseband signal generating section 102. In addition, the propagation environment information is comprised of parameters enabling estimations of propagation environments such as a Doppler frequency, condition of multipath, and signal level of an interfering signal.

When the frame timing signal is indicative of QPSK, QPSK scheme detection section 207 detects the in-phase component and quadrature component of the received quadrature baseband signal based on the amplitude distortion amount estimated signal and frequency offset amount estimated signal, and outputs a QPSK demodulated received digital signal to data detecting section 209.

When the frame timing signal is indicative of 8PSK, 8PSK scheme detection section 208 detects the in-phase component and quadrature component of the received quadrature baseband signal based on the amplitude distortion amount estimated signal and frequency offset amount estimated signal, and outputs an 8PSK demodulated received digital signal to data detecting section 209.

Data detecting section 209 divides the propagation environment information from the received digital signal to output to modulation scheme determining section 210.

Modulation scheme determining section 210 compares the propagation environment information with a predetermined threshold to judge whether the propagation environment is good or poor, and outputs modulation scheme determined information for instructing to use 16QAM, when the environment is good, while outputting the information for instructing to use QPSK, when the environment is poor. The modulation scheme determined information generated in modulation scheme determining section 210 is output to QPSK modulated quadrature baseband signal generating section 101, 16QAM modulated quadrature baseband signal generating section 102, in-phase component switching section 104 and quadrature component switching section 105.

In the configuration used in transmission in the terminal illustrated in FIG. 3, transmission data is output to QPSK modulated quadrate baseband signal generating section 301 and 8PSK modulated quadrature baseband signal generating section 302 along with the propagation environment information and the modulation scheme determined information. Frame timing signal generating section 308 generates a frame timing signal to output to QPSK modulated quadrature baseband signal generating section 301, 8PSK modulated quadrature baseband signal generating section 302 and pilot symbol generating section 303.

QPSK modulated quadrature baseband signal generating section 301 receives as its inputs the transmission data, the propagation environment information and the modulation scheme determined information, generates a QPSK modulated quadrature baseband signal according to the frame timing signal, and outputs an in-phase component of the QPSK modulated quadrature baseband signal to in-phase component switching section 304, while outputting a quadrature component of the QPSK modulated quadrature baseband signal to quadrature component switching section 305.

8PSK modulated quadrature baseband signal generating section 302 receives as its inputs the transmission data, the propagation environment information and the modulation scheme determined information, generates an 8PSK modulated quadrature baseband signal according to the frame timing signal, and outputs an in-phase component of the 8PSK modulated quadrature baseband signal to in-phase component switching section 304, while outputting a quadrature component of the 8PSK modulated quadrature baseband signal to quadrature component switching section 305.

Pilot symbol generating section 303 outputs an in-phase component of a pilot symbol to in-phase component switching section 304, while outputting a quadrature component of the pilot symbol to quadrature component switching section 305, according to the frame timing signal.

Based on the modulation scheme determined information, in-phase component switching section 304 switches between the in-phase component of the QPSK modulated quadrature baseband signal, in-phase component of the 8PSK modulated quadrature baseband signal and in-phase component of the pilot symbol to output to radio section 306 as an in-phase component of a transmission quadrature baseband signal.

Based on the modulation scheme determined information, quadrature component switching section 305 switches between the quadrature component of the QPSK modulated quadrature baseband signal, quadrature component of the 8PSK modulated quadrature baseband signal and quadrature component of the pilot symbol to output to radio section 306 as a quadrature component of the transmission quadrature baseband signal.

Radio section 306 receives as its inputs the in-phase component and quadrature component of the transmission quadrature baseband signal, and performs the predetermined radio processing on the baseband signal to output a transmission signal. The transmission signal is amplified in power amplifier 307, and the amplified transmission signal is transmitted from transmission antenna 309.

Figure 6A:
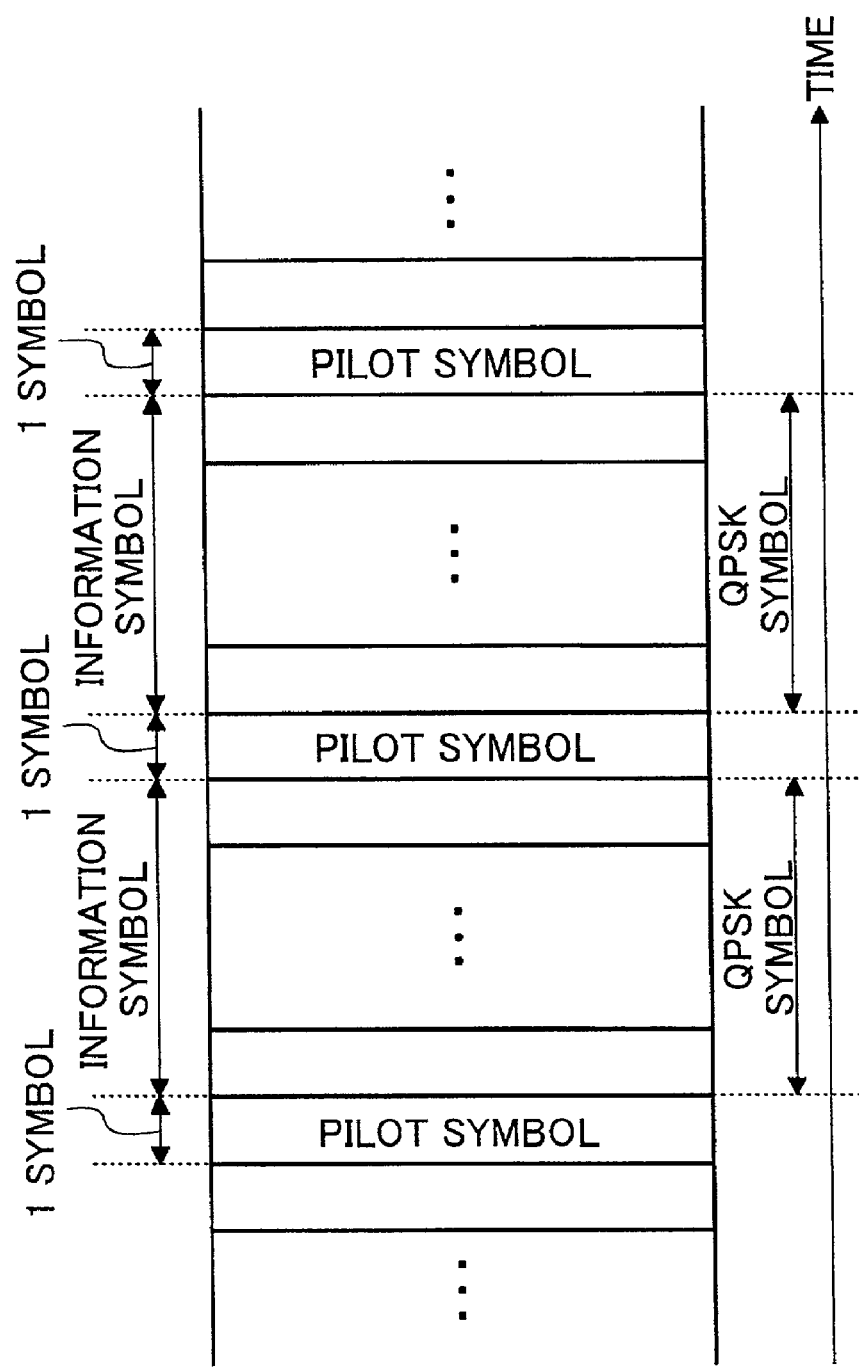
FIG. 6A is a view showing an example of a frame structure on uplink in the digital radio communication system according to the first embodiment of the present invention.
Figure 6B:
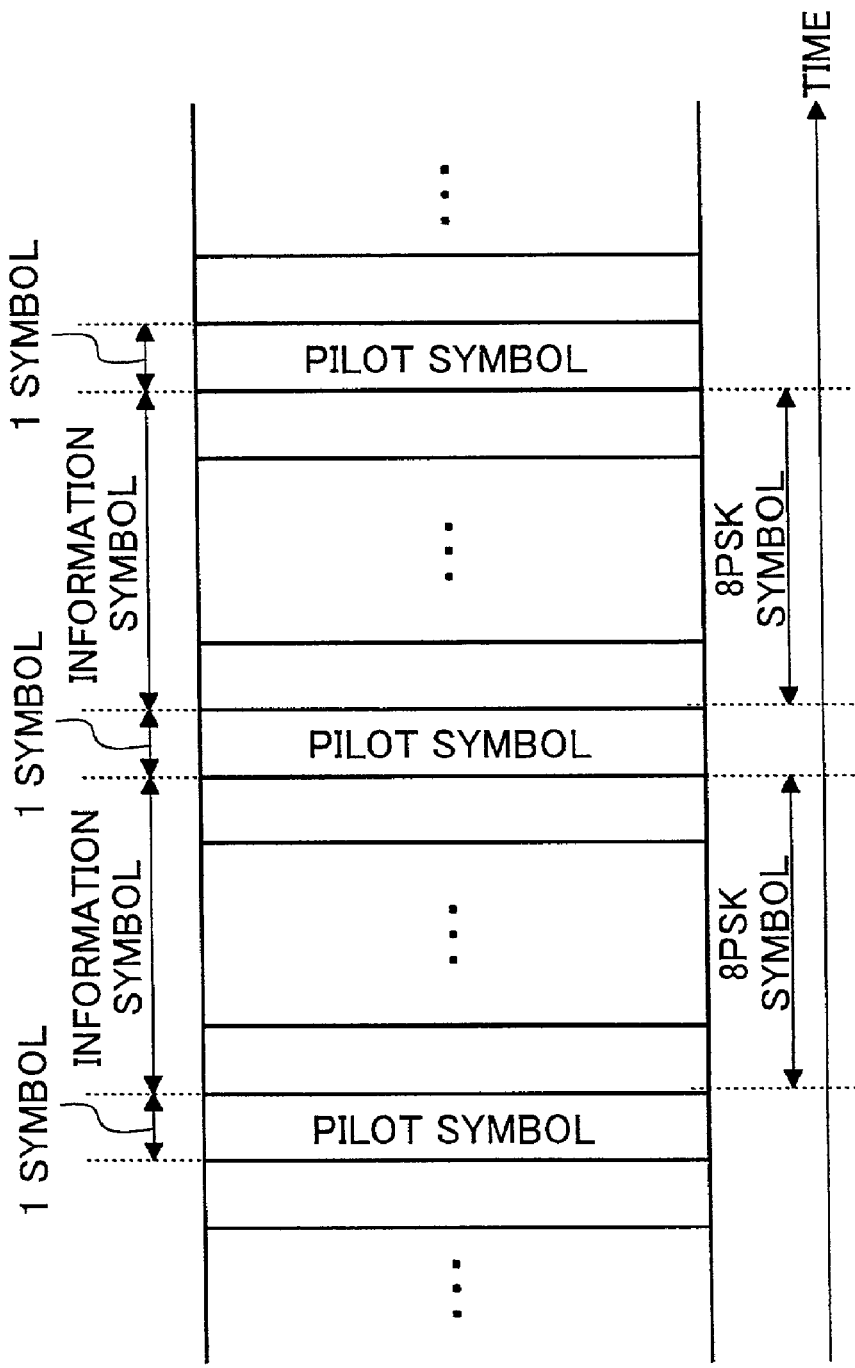
FIG. 6B is a view showing another example of the frame structure on uplink in the digital radio communication system according to the first embodiment of the present invention.

When QPSK is selected as the modulation scheme due to a poor propagation environment, a frame structure on uplink is as illustrated in FIG. 6A. Further, when 8PSK is selected as the modulation scheme due to a good propagation environment, the frame structure on uplink is as illustrated in FIG. 6B.

In the configuration used in reception in the terminal illustrated in FIG. 4, radio section 402 performs the predetermined radio processing on a signal received at antenna 401, and outputs an in-phase component and quadrature component of a received quadrature baseband signal.

Frame timing signal generating section 405 receives as its input the received quadrature baseband signal, and generates a frame timing signal to output to amplitude distortion amount estimating section 403, frequency offset amount estimating section 404, QPSK scheme detection section 407 and 16QAM scheme detection section 408.

Amplitude distortion amount estimating section 403 extracts a pilot symbol from the received quadrature baseband signal according to the frame timing signal, estimates an amplitude distortion amount from the in-phase and quadrature components of the pilot symbol, and outputs an amplitude distortion amount estimated signal to QPSK scheme detection section 407 and 16QAM scheme detection section 408.

Frequency offset amount estimating section 404 extracts the pilot symbol from the received quadrature baseband signal according to the frame timing signal, estimates a frequency offset amount from the in-phase and quadrature components of the pilot symbol, and outputs a frequency offset amount estimated signal to QPSK scheme detection section 407 and 16QAM scheme detection section 408.

Propagation environment information generating section 406 estimates a propagation environment based on the received quadrature baseband signal to generate propagation environment information. The propagation environment information generated in propagation environment information generating section 406 is provided to QPSK modulated quadrature baseband signal generating section 301 and 8PSK modulated quadrature baseband signal generating section 302.

When the frame timing signal is indicative of QPSK, QPSK scheme detection section 407 detects the in-phase component and quadrature component of the received quadrature baseband signal based on the amplitude distortion amount estimated signal and frequency offset amount estimated signal, and outputs a QPSK demodulated received digital signal to data detecting section 409.

When the frame timing signal is indicative of 16QAM, 16QAM scheme detection section 408 detects the in-phase component and quadrature component of the received quadrature baseband signal based on the amplitude distortion amount estimated signal and frequency offset amount estimated signal, and outputs a 16QAM demodulated received digital signal to data detecting section 409.

Data detecting section 409 divides the propagation environment information from the received digital signal to output to modulation scheme determining section 410.

Modulation scheme determining section 410 compares the propagation environment information with a predetermined threshold to judge whether the propagation environment is good or poor, and outputs modulation scheme determined information for instructing to use 8PSK, when the environment is good, while outputting the information for instructing to use QPSK, when the environment is poor. The modulation scheme determined information generated in modulation scheme determining section 410 is output to QPSK modulated quadrature baseband signal generating section 301, 8PSK modulated quadrature baseband signal generating section 302, in-phase component switching section 304 and quadrature component switching section 305.

Thus, in the first embodiment, in the digital radio communication system and schemes, a signal modulation scheme on downlink is determined corresponding to propagation environments from at least two kinds of modulation schemes including the multi-level modulation scheme with the modulation level of 16 or more where the amplitude is provided with information, while a signal modulation scheme on uplink is determined corresponding to propagation environments from at least two kinds of phase modulation schemes.

As a result, it is possible to perform radio communications with the desired quality both on uplink and on downlink, giving priority to improving a data transmission rate on downlink, while giving priority to the benefit and convenience in terminals on uplink. Accordingly, it is possible to construct the digital radio communication system with the improvement in the data transmission rate and the benefit and convenience in terminals both considered.

In addition, the first embodiment explains the case that two kinds of modulation schemes on downlink are QPSK and 16QAM, and that two kinds of modulation schemes on uplink are QPSK and 8PSK. However, the present invention is not limited to the above case, and is applicable to any cases that modulation schemes selected on downlink include at least one multi-level modulation scheme with the modulation level of 16 or more where the amplitude is provided with information, and that modulation schemes selected on uplink are all phase modulation schemes. Further, the frame structures are not limited to those in FIGS. 5A, 5B, 6A and 6B, and may have a symbol for frame synchronization inserted therein.

Further, it may be possible to determine a signal modulation scheme on downlink corresponding to propagation environments from at least two kinds of modulation schemes including the multi-level modulation scheme with the modulation level of 16 or more where the amplitude is provided with information, while using a single phase modulation scheme as the modulation scheme on uplink. Furthermore, it may be possible to use on downlink the multi-level modulation scheme with the modulation level of 16 or more where the amplitude is provided with information, while determining a signal modulation scheme on uplink corresponding to propagation environments from at least two kinds of phase modulation schemes.

Second Embodiment

The second embodiment describes a case of using two types of modulation schemes, namely, QPSK and 16QAM on downlink and of using two types of modulation schemes, namely, QPSK and 8PSK on uplink.

Figure 7:
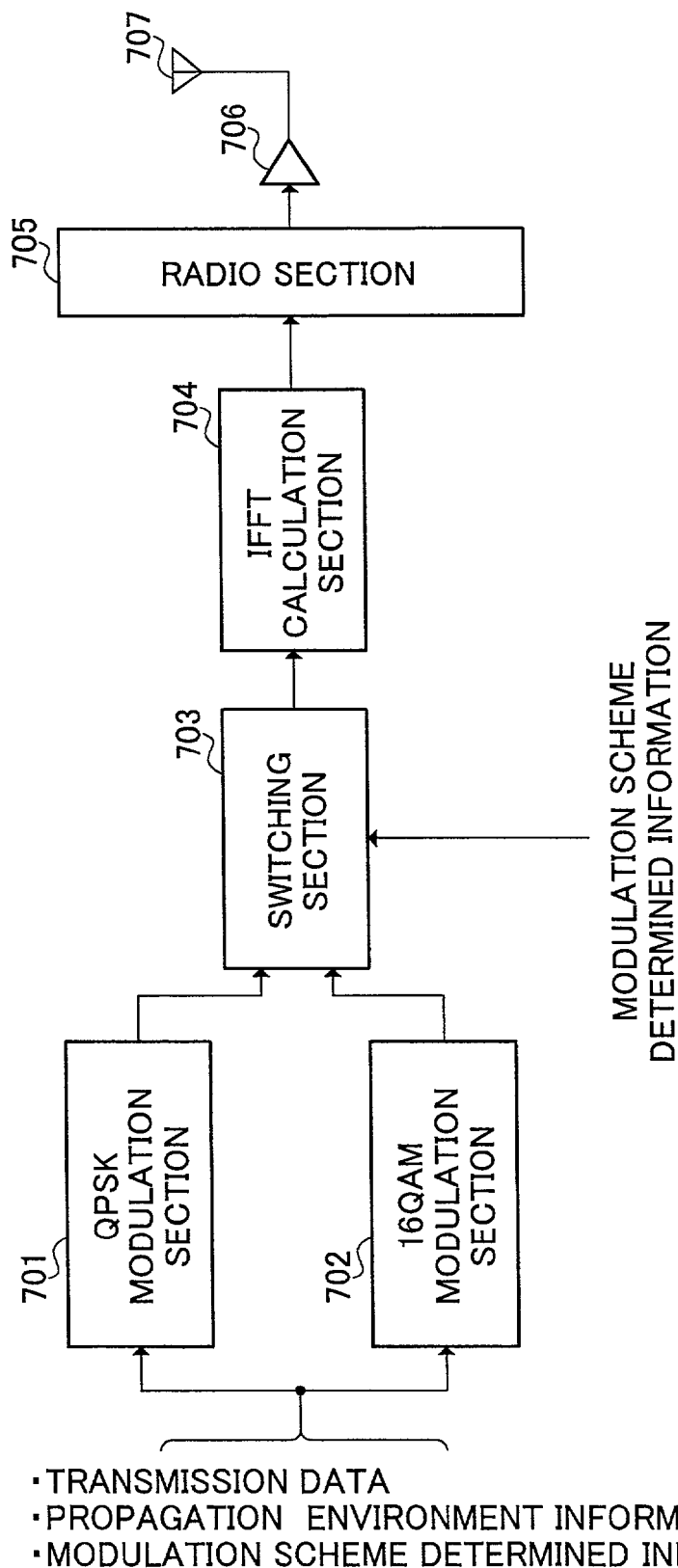
FIG. 7 is a block diagram illustrating a configuration for use in transmitting signals in a base station in a digital radio communication system according to a second embodiment of the present invention.
Figure 8:
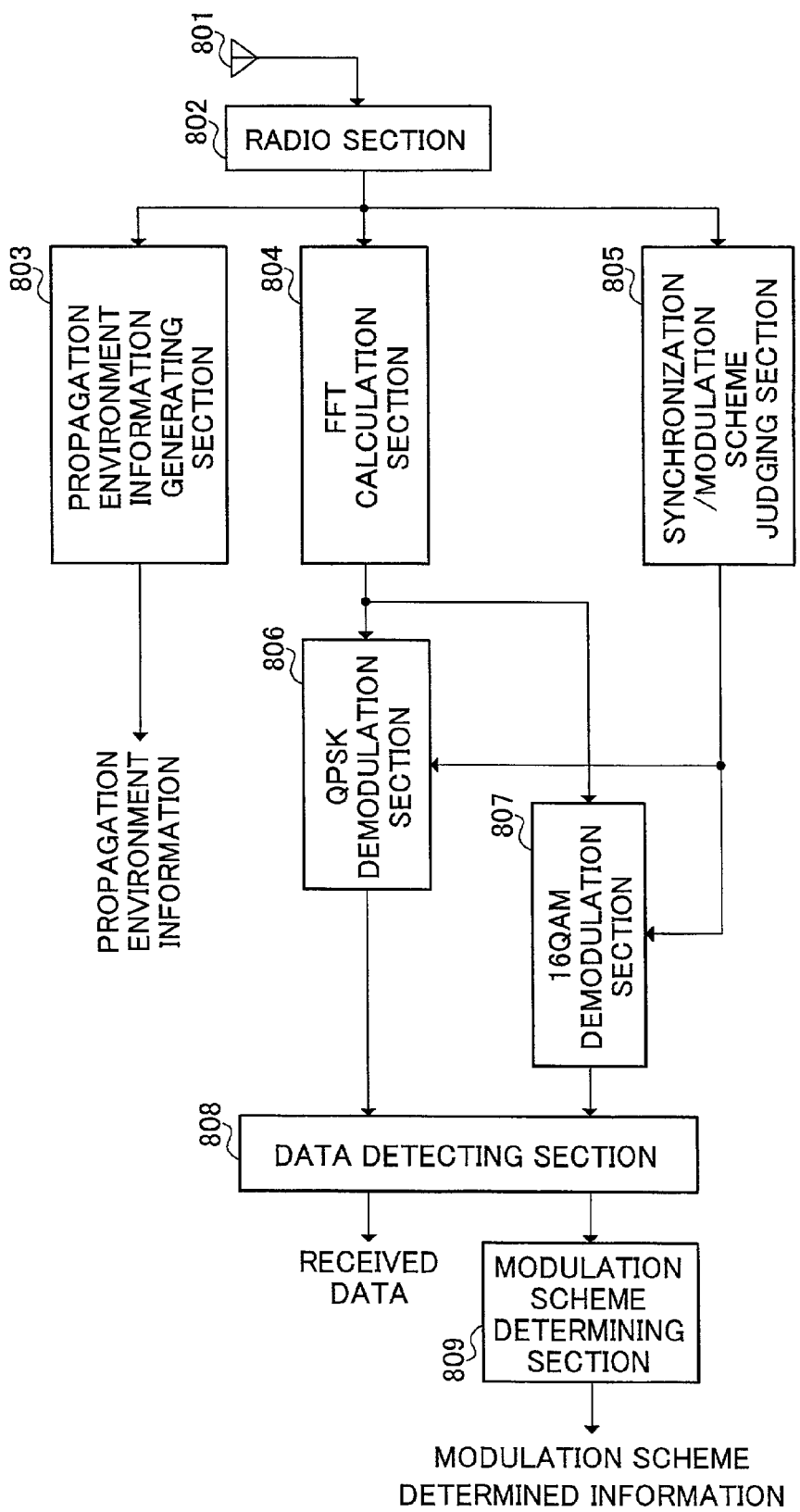
FIG. 8 is a block diagram illustrating a configuration for use in receiving signals in a terminal in the digital radio communication system according to the second embodiment of the present invention.

FIG. 7 is a block diagram illustrating a configuration for use in transmitting signals in a base station in a digital radio communication system according to the second embodiment. In addition, a configuration for use in receiving signals in the base station in the digital radio communication system according to the second embodiment is the same as in FIG. 2 explained in the first embodiment, and the explanation is omitted. Further, FIG. 8 is a block diagram illustrating a configuration for use in receiving signals in a terminal in the digital radio communication system according to the second embodiment. In addition, a configuration for use in transmitting signals in the terminal in the digital radio communication system according to the second embodiment is the same as in FIG. 3 explained in the first embodiment, and the explanation is omitted.

In the configuration used in transmission in the base station illustrated in FIG. 7, transmission data including preamble is output to QPSK modulation section 701 and 16QAM modulation section 702 along with propagation environment information and modulation scheme determined information.

QPSK modulation section 701 receives as its inputs the transmission data, the propagation environment information and the modulation scheme determined information, and generates a QPSK modulated signal to output to switching section 703. 16QAM modulation section 702 receives as its inputs the transmission data, the propagation environment information and the modulation scheme determined information, and generates a 16QAM modulated signal to output to switching section 703.

Based on the modulation scheme determined information, switching section 703 switches the QPSK modulated signal and 16QAM modulated signal to output to inverse fast Fourier transform (IFFT) calculation section 704 as a transmission modulated signal.

Figure 9:
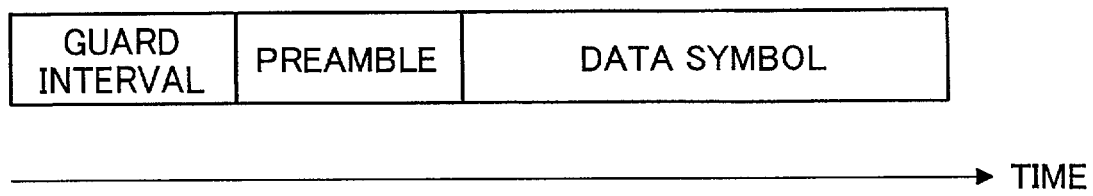
FIG. 9 is a view showing an example of a frame structure of an OFDM signal in the digital radio communication system according to the second embodiment of the present invention.

IFFT calculation section 704 calculates IFF transform on the transmission modulation signal, and outputs a transmission OFDM signal to radio section 705. The transmission OFDM signal is comprised of, as shown in FIG. 9, guard interval 901, preamble 902 and data symbol 903.

Radio section 705 performs the predetermined radio processing on the transmission OFDM signal to output a transmission signal. The transmission signal is amplified in power amplifier 706, and the amplified transmission signal is transmitted from transmission antenna 707.

In the configuration used in reception in the terminal illustrated in FIG. 8, radio section 802 performs the predetermined radio processing on a signal received at antenna 801, and outputs a received OFDM signal.

Propagation environment information generating section 803 estimates a propagation environment based on the received OFDM signal to generate propagation environment information. The propagation environment information generated in propagation environment information generating section 803 is provided to QPSK modulated quadrature baseband signal generating section 301 and 8PSK modulated quadrature baseband signal generating section 302.

IFFT calculation section 804 calculates IFF transform on the received OFDM signal, and outputs a received modulated signal to QPSK demodulation section 806 and 16QAM demodulation section 807.

Synchronization/modulation scheme judging section 805 acquires synchronization with the transmitting side using the preamble of the received OFDM signal, divides the modulation scheme determined information, and outputs a control signal indicative of synchronization timing and modulation scheme to QPSK demodulation section 806 and 16QAM demodulation section 807.

When the control signal is indicative of QPSK, QPSK demodulation section 806 demodulates the received modulated signal, and outputs a QPSK demodulated received digital signal to data detecting section 809.

When the control signal is indicative of 16QAM, 16QAM demodulation section 807 demodulates the received modulated signal, and outputs a 16QAM demodulated received digital signal to data detecting section 809.

Data detecting section 809 divides the propagation environment information from the received digital signal to output to modulation scheme determining section 809.

Modulation scheme determining section 809 compares the propagation environment information with a predetermined threshold to judge whether the propagation environment is good or poor, and outputs modulation scheme determined information for instructing to use 8PSK, when the environment is good, while outputting the information for instructing to use QPSK, when the environment is poor. The modulation scheme determined information generated in modulation scheme determining section 809 is output to QPSK modulated quadrature baseband signal generating section 301, 8PSK modulated quadrature baseband signal generating section 302, in-phase component switching section 304 and quadrature component switching section 305.

The effect in the second embodiment will be explained next. When an information amount on downlink is larger than that on uplink, the frequency band on downlink is a wide band, while the frequency band on uplink is a narrow band.

Since the wide band tends to be affected by frequency selective fading, it is preferable to use the OFDM system immune to the frequency selective fading on downlink with a large information amount. Meanwhile, since the narrow band is not affected by the frequency selective fading very much, taking the benefit and convenience in terminals into account, it is preferable to use a single-carrier system, which provides less power consumption of transmission power amplifier, on downlink with a small information amount.

Thus, in the second embodiment, in the digital radio communication system and schemes, a multi-carrier system is used on downlink, while a single-carrier system is used on uplink, and it is thereby possible to construct the digital radio communication system with the improvement in the data transmission rate and the benefit and convenience in terminals both considered.

Further, a signal modulation scheme on downlink is determined corresponding to propagation environments from at least two kinds of modulation schemes including the multi-level modulation scheme with the modulation level of 16 or more where the amplitude is provided with information, while a signal modulation scheme on uplink is determined corresponding to propagation environments from at least two kinds of phase modulation schemes. It is thus possible to perform radio communications with the desired quality both on uplink and on downlink, giving priority to improving a data transmission rate on downlink, while giving priority to the benefit and convenience in terminals.

In addition, while the OFDM system is used in the second embodiment, the present invention is not limited to this system, and the same effects are obtained when other multi-carrier systems are used.

Third Embodiment

In this embodiment, the configurations used in transmission and reception are both provided with a function for generating a clock. Since generating sources are different between the configurations for reception and transmission, in the configuration for reception, the detection is sometimes performed at a timing with the offset generated from an ideal determination time. At this stage, the error rate deteriorates due to an error (amplitude error) from a signal point caused by the offset. Further, the configuration for reception estimates a phase on the I-Q plane, amplitude variation and frequency offset from a pilot symbol. However, when the detection is performed at the timing with the offset, the pilot symbol signal has an error from an ideal signal point of the pilot symbol, and the estimation accuracy in the phase on the I-Q plane, amplitude variation and frequency offset deteriorates.

In order to solve the above problem, the third embodiment explains a case that in a frame structure in which one pilot symbol is inserted in every three or more successive information symbols, the number of signal points of each of a symbol immediately before the pilot symbol and another symbol immediately after the pilot symbol is two or more, and is less than the number of signal points of each of other information symbols.

The third embodiment explains the case on the assumption that two types of modulation schemes on downlink are QPSK and 16QAM, while two types of modulation schemes on uplink are QPSK and 8PSK.

Figure 10:
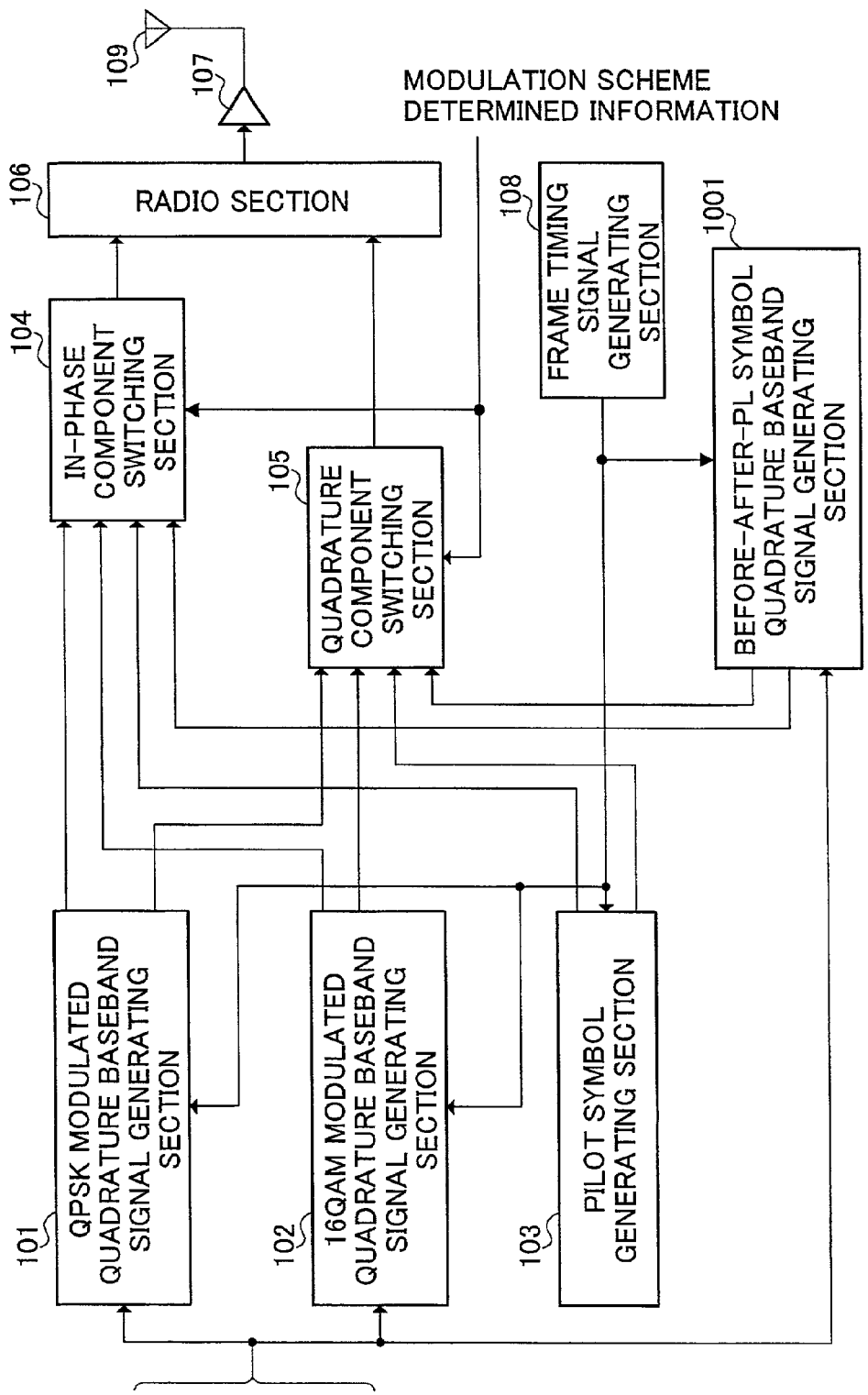
FIG. 10 is a block diagram illustrating a configuration for use in transmitting signals in a base station in a digital radio communication system according to a third embodiment of the present invention.
Figure 11:
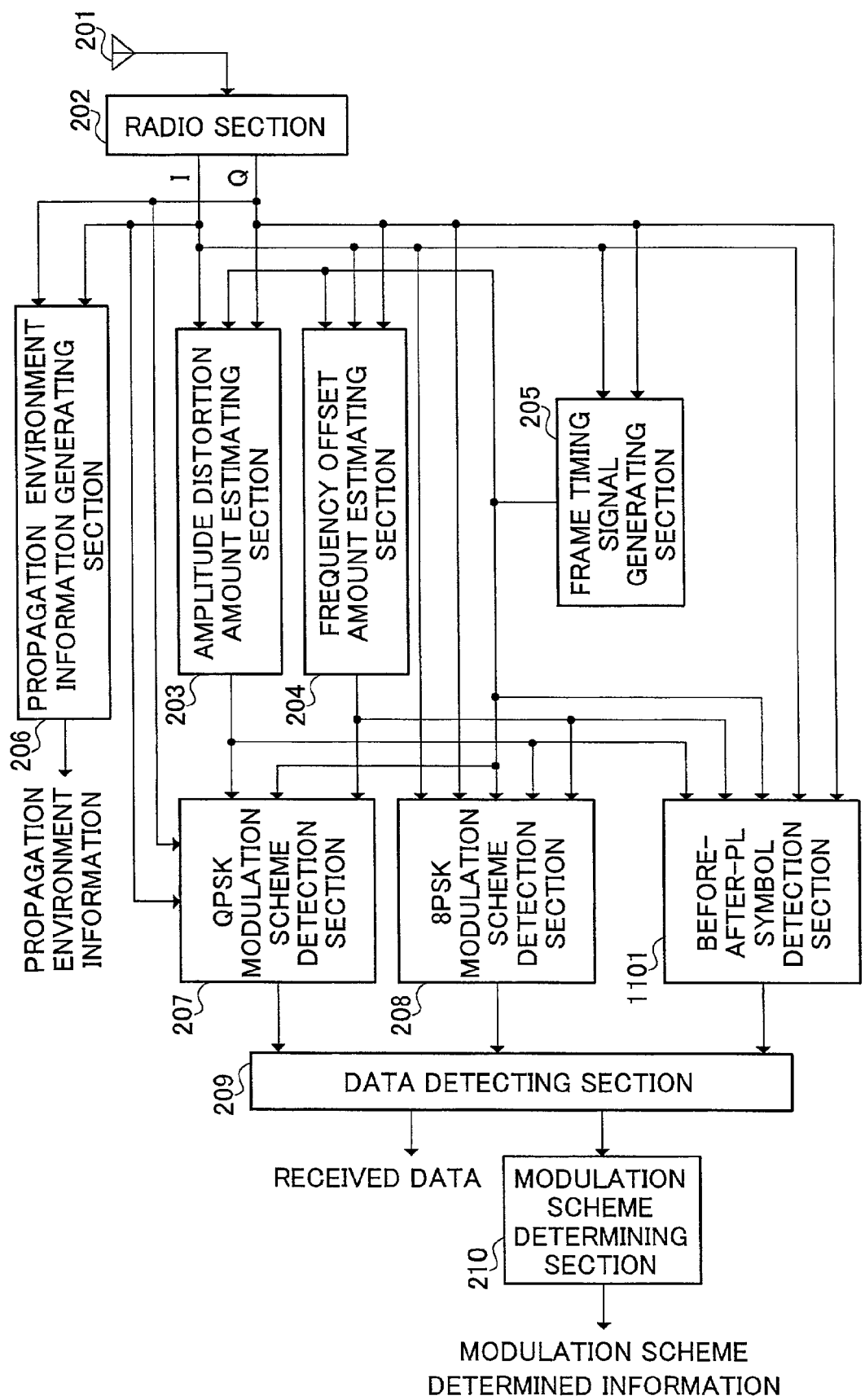
FIG. 11 is a block diagram illustrating a configuration for use in receiving signals in the base station in the digital radio communication system according to the third embodiment of the present invention.
Figure 12:
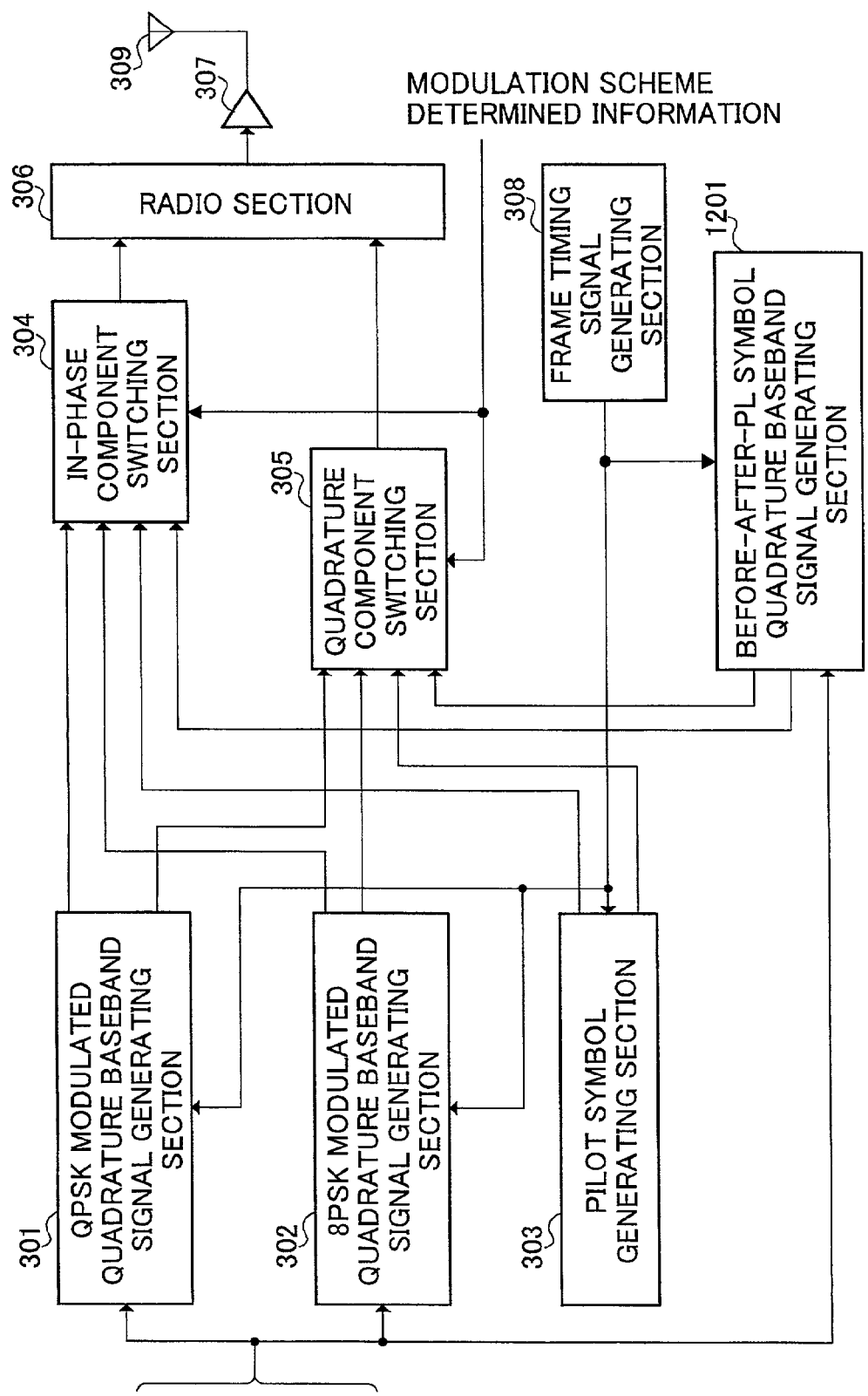
FIG. 12 is a block diagram illustrating a configuration for use in transmitting signals in a terminal in the digital radio communication system according to the third embodiment of the present invention.
Figure 13:
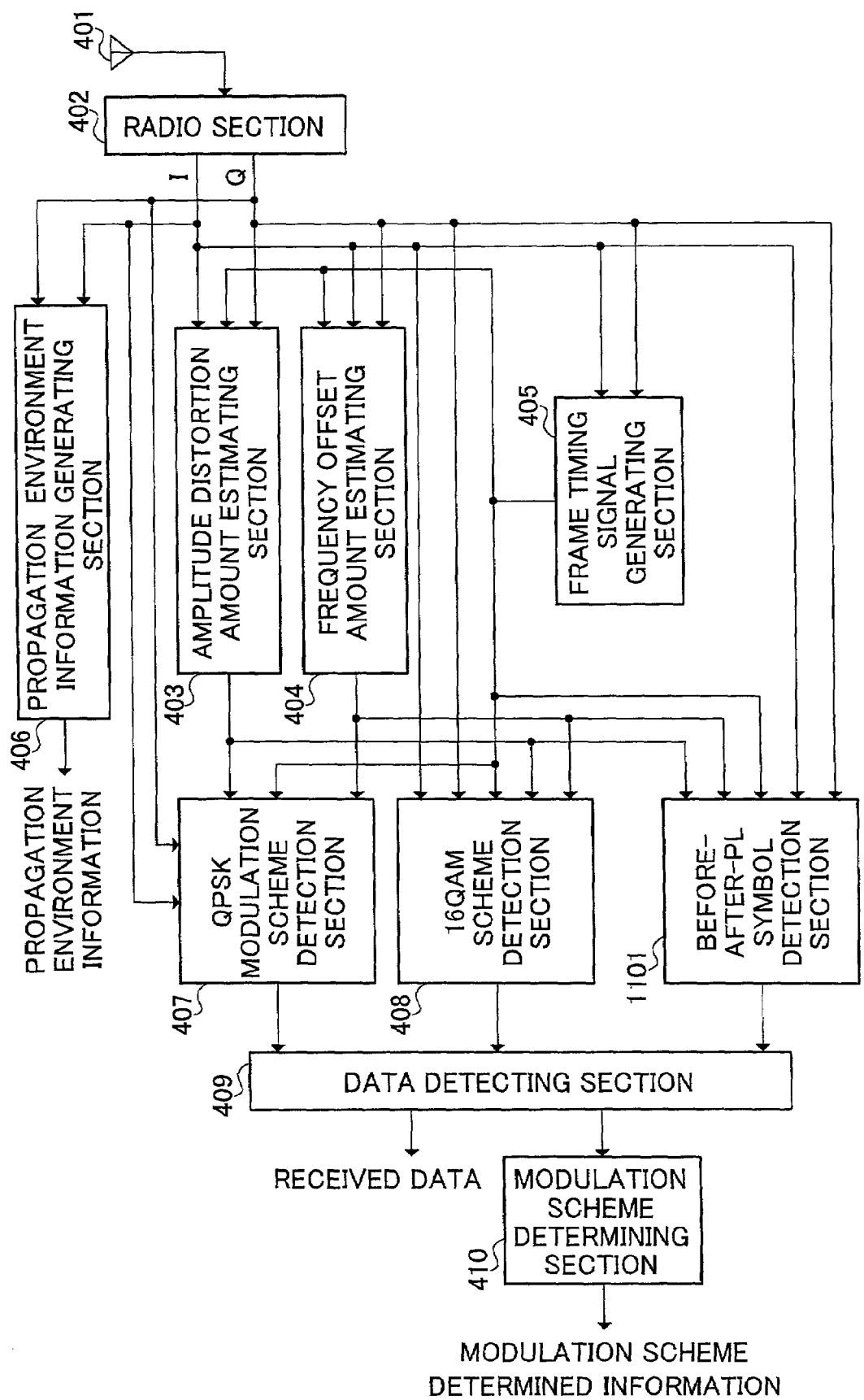
FIG. 13 is a block diagram illustrating a configuration for use in receiving signals in the terminal in the digital radio communication system according to the third embodiment of the present invention.

FIG. 10 is a block diagram illustrating a configuration for use in transmitting signals in a base station in a digital radio communication system according to the third embodiment, and FIG. 11 is a block diagram illustrating a configuration for use in receiving signals in the base station in the digital radio communication system according to the third embodiment. FIG. 12 is a block diagram illustrating a configuration for use in transmitting signals in a terminal in the digital radio communication system according to the third embodiment, and FIG. 13 is a block diagram illustrating a configuration for use in receiving signals in the terminal in the digital radio communication system according to the third embodiment.

In addition, in FIGS. 10 to 13, the sections common to those in FIGS. 1 to 4 explained in the first embodiment are assigned the same reference numerals as in FIGS. 1 to 4, and the explanation is omitted.

The configuration used in transmission in the base station illustrated in FIG. 10 is further provided with before-after-PL symbol quadrature baseband signal generating section 1001 that modulates each symbol immediately before or after a pilot symbol (PL), as compared to the configuration used in transmission in the base station illustrated in FIG. 1.

Frame timing generating section 108 generates a frame timing signal to output to QPSK modulated quadrature baseband signal generating section 101, 16QAM modulated quadrature baseband signal generating section 102, pilot symbol generating section 103 and before-after-PL symbol quadrature baseband signal generating section 1001.

Before-after-PL symbol quadrature baseband signal generating section 1001 receives as its inputs the transmission data, the propagation environment information and the modulation scheme determined information, generates a quadrature baseband signal (hereinafter referred to as "before-after-PL symbol quadrature baseband signal") modulated by, for example, BPSK that provides less signal points than the other modulation scheme used for other information symbols, and according to the frame timing signal, outputs an in-phase component of the before-after-PL symbol quadrature baseband signal to in-phase component switching section 104, while outputting a quadrature component of the before-after-PL symbol quadrature baseband signal to quadrature component switching section 105.

Based on the modulation scheme determined information, in-phase component switching section 104 switches between the in-phase component of the QPSK modulated quadrature baseband signal, in-phase component of the 16QAM modulated quadrature baseband signal, in-phase component of the before-after-PL symbol quadrature baseband signal and in-phase component of the pilot symbol to output to radio section 106 as an in-phase component of a transmission quadrature baseband signal.

Based on the modulation scheme determined information, quadrature component switching section 105 switches between the quadrature component of the QPSK modulated quadrature baseband signal, quadrature component of the 16QAM modulated quadrature baseband signal, quadrature component of the before-after-PL symbol quadrature baseband signal and quadrature component of the pilot symbol to output to radio section 106 as a quadrature component of the transmission quadrature baseband signal.

Figure 14A:
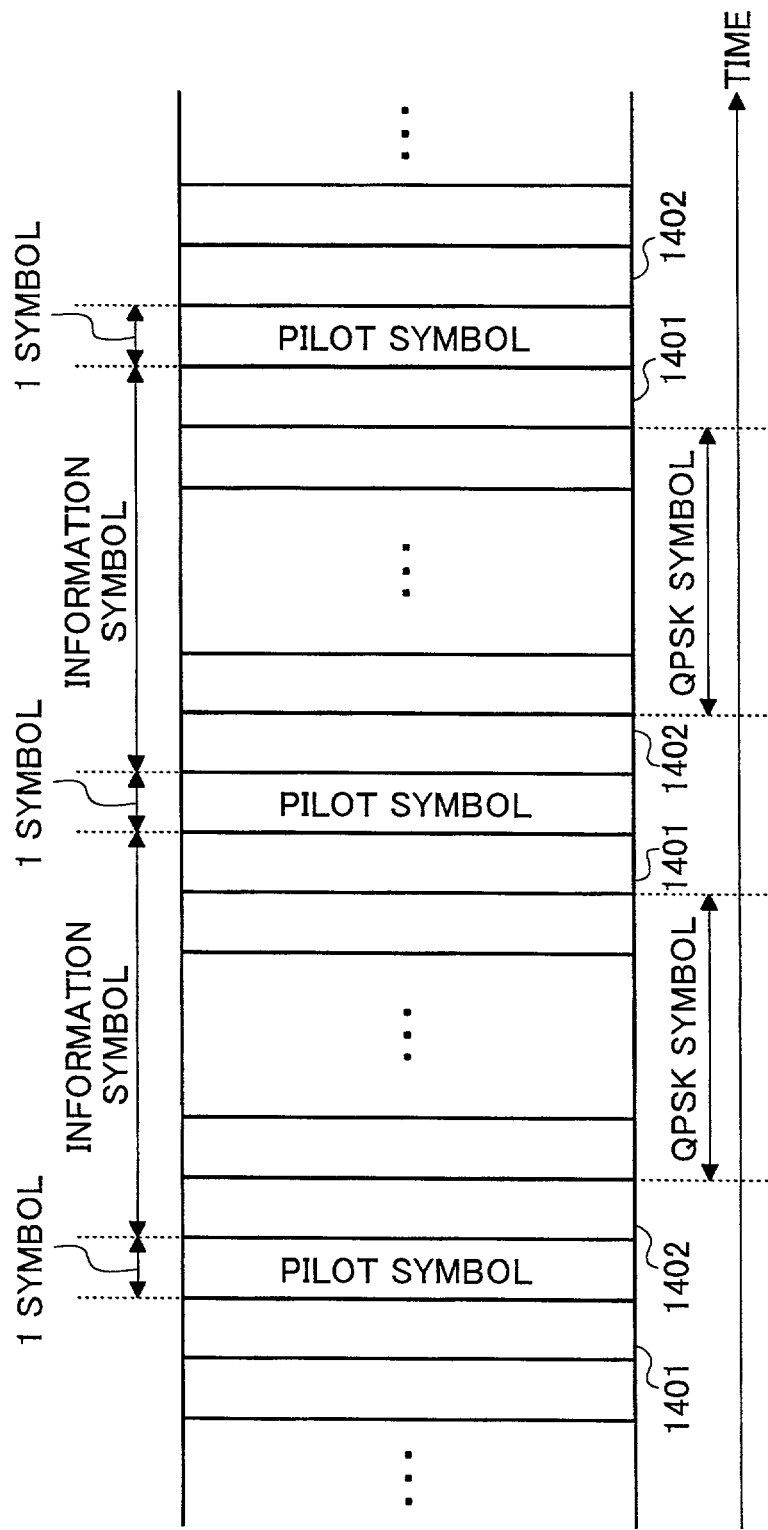
FIG. 14A is a view showing an example of a frame structure on downlink in the digital radio communication system according to the third embodiment of the present invention.
Figure 14B:
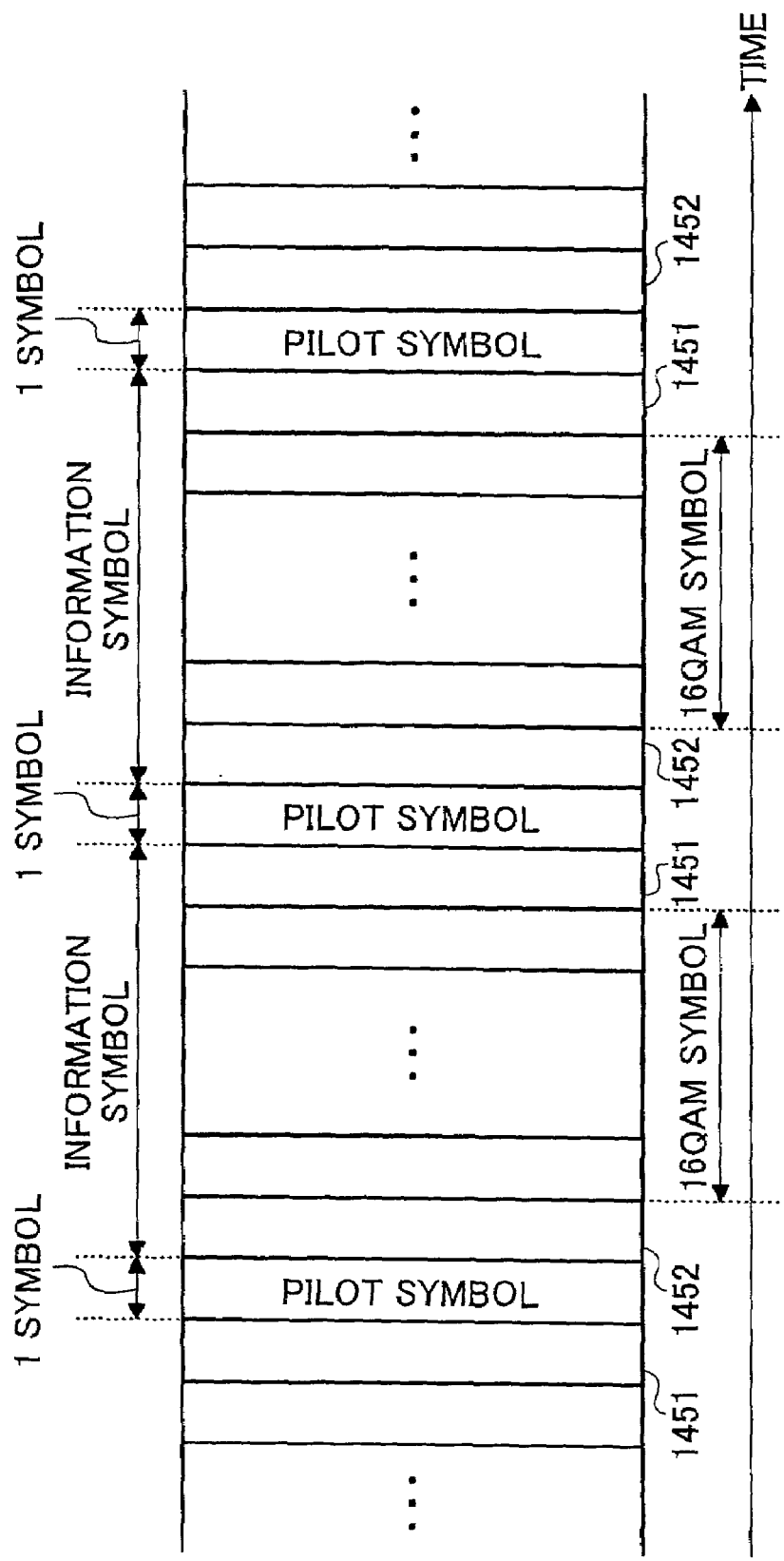
FIG. 14B is a view showing another example of the frame structure on downlink in the digital radio communication system according to the third embodiment of the present invention.

When QPSK is selected as the modulation scheme due to a poor propagation environment, a frame structure on downlink is as illustrated in FIG. 14A. In FIG. 14A, reference numeral 1401 denotes a symbol immediately before the pilot symbol, while reference numeral 1402 denotes a symbol immediately after the pilot symbol. Further, when 16QAM is selected as the modulation scheme due to a good propagation environment, a frame structure on downlink is as illustrated in FIG. 14B. In FIG. 14B, reference numeral 1451 denotes a symbol immediately before the pilot symbol, while reference numeral 1452 denotes a symbol immediately after the pilot symbol.

The configuration used in reception in the base station illustrated in FIG. 11 is further provided with before-after-PL symbol detection section 1101 that detects each symbol immediately before or after a pilot symbol (PL), as compared to the configuration used in reception in the base station illustrated in FIG. 2.

Amplitude distortion amount estimating section 203 extracts a pilot symbol from the received quadrature baseband signal according to the frame timing signal, estimates an amplitude distortion amount from the in-phase and quadrature components of the pilot symbol, and outputs an amplitude distortion amount estimated signal to QPSK scheme detection section 207, 8PSK scheme detection section 208 and before-after-PL symbol detection section 1101.

Frequency offset amount estimating section 204 extracts the pilot symbol from the received quadrature baseband signal according to the frame timing signal, estimates a frequency offset amount from the in-phase and quadrature components of the pilot symbol, and outputs a frequency offset amount estimated signal to QPSK scheme detection section 207, 8PSK scheme detection section 208 and before-after-PL symbol detection section 1101.

When the frame timing signal is indicative of the symbol immediately before or after the pilot symbol, before-after-PL symbol detection section 1101 detects the in-phase component and quadrature component of the received quadrature baseband signal based on the amplitude distortion amount estimated signal and frequency offset amount estimated signal, and outputs a received before-after-PL symbol quadrature baseband signal to data detecting section 209.

Data detecting section 209 divides the propagation environment information from the received digital signal to output to modulation scheme determining section 210.

The configuration used in transmission in the terminal illustrated in FIG. 12 is further provided with before-after-PL symbol quadrature baseband signal generating section 1201 that modulates each symbol immediately before or after a pilot symbol (PL), as compared to the configuration used in transmission in the terminal illustrated in FIG. 3.

Frame timing generating section 308 generates a frame timing signal to output to QPSK modulated quadrature baseband signal generating section 301, 8PSK modulated quadrature baseband signal generating section 302, pilot symbol generating section 303 and before-after-PL symbol quadrature baseband signal generating section 1201.

Before-after-PL symbol quadrature baseband signal generating section 1201 receives as its inputs the transmission data, the propagation environment information and the modulation scheme determined information, generates a quadrature baseband signal (hereinafter referred to as "before-after-PL symbol quadrature baseband signal") modulated by, for example, BPSK that provides less signal points than the other modulation scheme used for other information symbols, and according to the frame timing signal, outputs an in-phase component of the before-after-PL symbol quadrature baseband signal to in-phase component switching section 304, while outputting a quadrature component of the before-after-PL symbol quadrature baseband signal to quadrature component switching section 305.

Based on the modulation scheme determined information, in-phase component switching section 304 switches between the in-phase component of the QPSK modulated quadrature baseband signal, in-phase component of the 8PSK modulated quadrature baseband signal, in-phase component of the before-after-PL symbol quadrature baseband signal and in-phase component of the pilot symbol to output to radio section 306 as an in-phase component of a transmission quadrature baseband signal.

Based on the modulation scheme determined information, quadrature component switching section 305 switches between the quadrature component of the QPSK modulated quadrature baseband signal, quadrature component of the 8PSK modulated quadrature baseband signal, quadrature component of the before-after-PL symbol quadrature baseband signal and quadrature component of the pilot symbol to output to radio section 306 as a quadrature component of the transmission quadrature baseband signal.

Figure 15A:
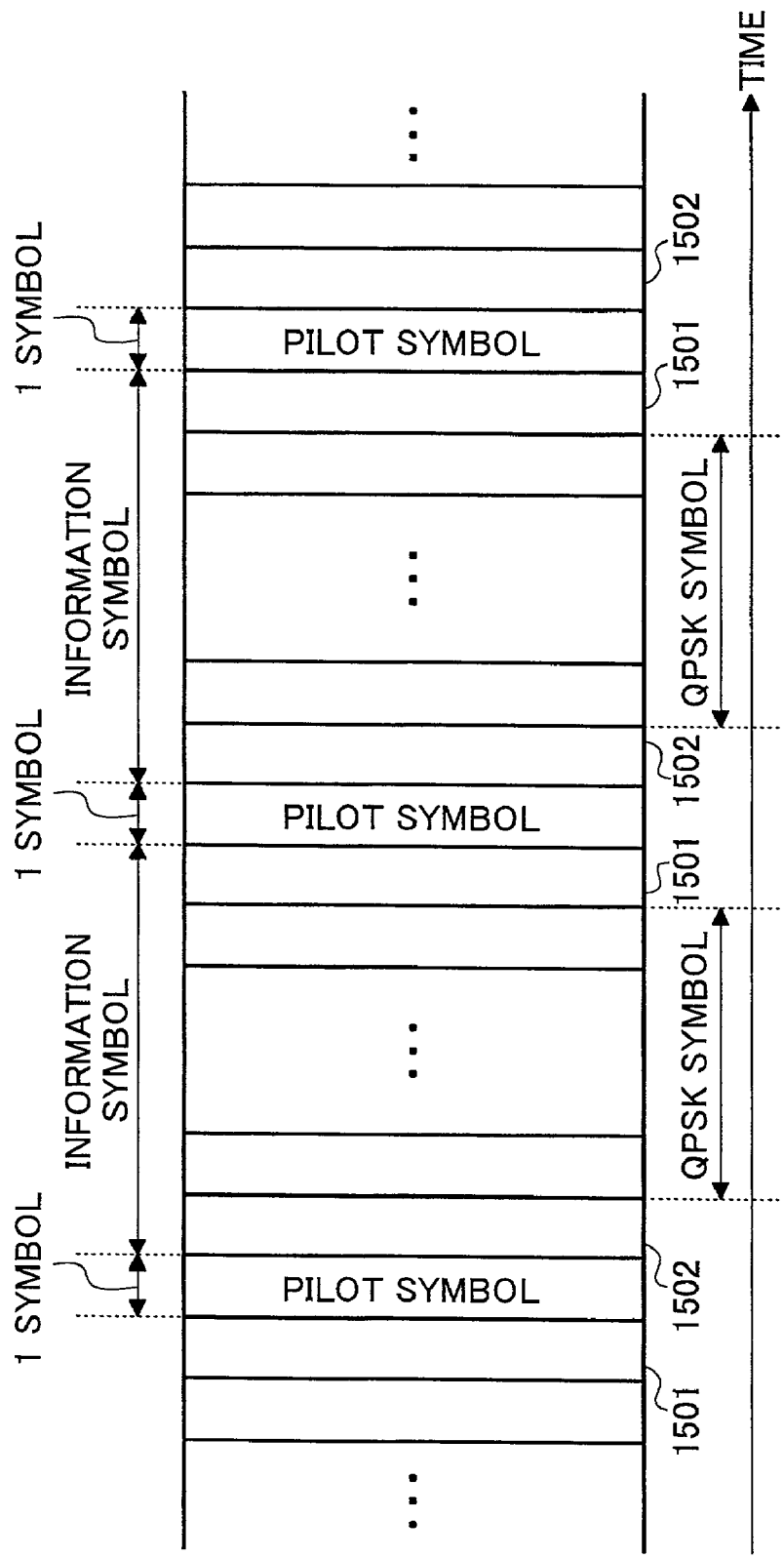
FIG. 15A is a view showing an example of a frame structure on uplink in the digital radio communication system according to the third embodiment of the present invention.
Figure 15B:
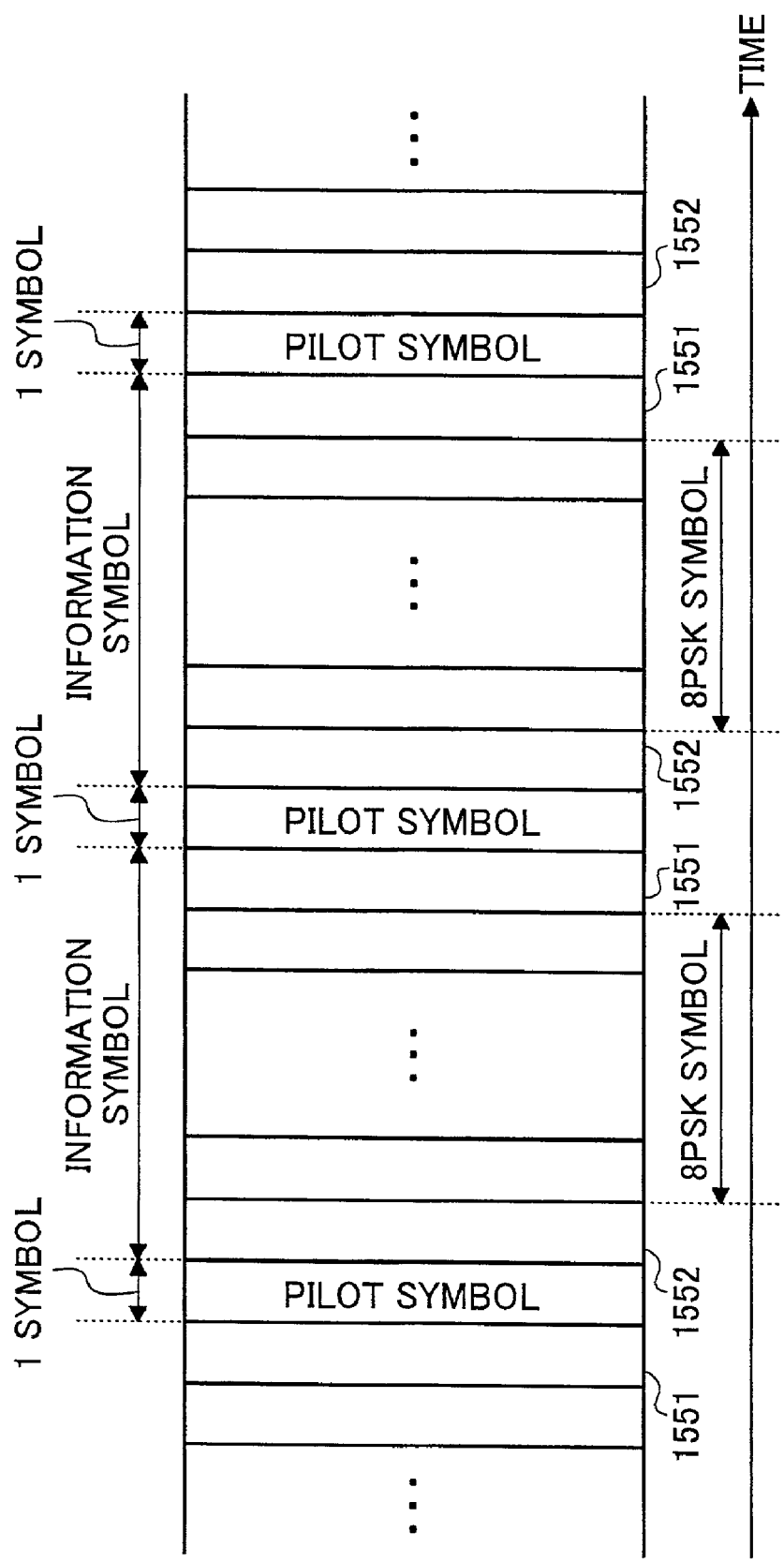
FIG. 15B is a view showing another example of the frame structure on uplink in the digital radio communication system according to the third embodiment of the present invention.

When QPSK is selected as the modulation scheme due to a poor propagation environment, a frame structure on uplink is as illustrated in FIG. 15A. In FIG. 15A, reference numeral 1501 denotes a symbol immediately before the pilot symbol, while reference numeral 1502 denotes a symbol immediately after the pilot symbol. Further, when 8PSK is selected as the modulation scheme due to a good propagation environment, a frame structure on uplink is as illustrated in FIG. 15B. In FIG. 15B, reference numeral 1551 denotes a symbol immediately before the pilot symbol, while reference numeral 1552 denotes a symbol immediately after the pilot symbol.

The configuration used in reception in the terminal illustrated in FIG. 13 is further provided with before-after-PL symbol detection section 1301 that detects each symbol immediately before or after a pilot symbol (PL), as compared to the configuration used in reception in the terminal illustrated in FIG. 4.

Amplitude distortion amount estimating section 403 extracts a pilot symbol from the received quadrature baseband signal according to the frame timing signal, estimates an amplitude distortion amount from the in-phase and quadrature components of the pilot symbol, and outputs an amplitude distortion amount estimated signal to QPSK scheme detection section 407, 16QAM scheme detection section 408 and before-after-PL symbol detection section 1301.

Frequency offset amount estimating section 404 extracts the pilot symbol from the received quadrature baseband signal according to the frame timing signal, estimates a frequency offset amount from the in-phase and quadrature components of the pilot symbol, and outputs a frequency offset amount estimated signal to QPSK scheme detection section 407, 16QAM scheme detection section 408 and before-after-PL symbol detection section 1301.

When the frame timing signal is indicative of the symbol immediately before or after the pilot symbol, before-after-PL symbol detection section 1301 detects the in-phase component and quadrature component of the received quadrature baseband signal based on the amplitude distortion amount estimated signal and frequency offset estimated signal, and outputs a received before-after-PL symbol quadrature baseband signal to data detecting section 409.

Data detecting section 409 divides the propagation environment information from the received digital signal to output to modulation scheme determining section 410.

Figure 16:
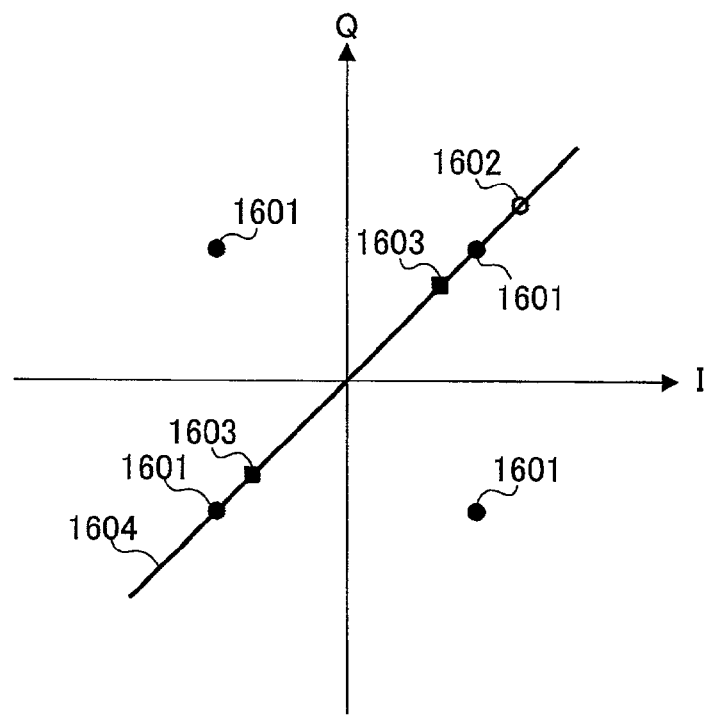
FIG. 16 is a view showing an example of a signal space diagram on the in-phase(I)-quadrature (Q) plane of QPSK in the digital radio communication system according to the third embodiment of the present invention.

FIG. 16 shows a signal space diagram on the in-phase(I)-quadrature (Q) plane of QPSK to indicate a signal point of a pilot symbol and signal points of each symbol immediately before or after the pilot symbol. In FIG. 16, reference numerals 1601 denote signal points of a QPSK modulated signal, reference numeral 1602 denotes a signal point of the pilot symbol, and reference numerals 1603 denote signal points of each symbol immediately before or after the pilot symbol. Further, reference numeral 1604 denotes a virtual line connecting the signal point of the pilot symbol and the origin on the I-Q plane. With respect to each symbol immediately before of after the pilot symbol, at least two signal points 1603 are arranged on the ideal line 1604.

Figure 17:
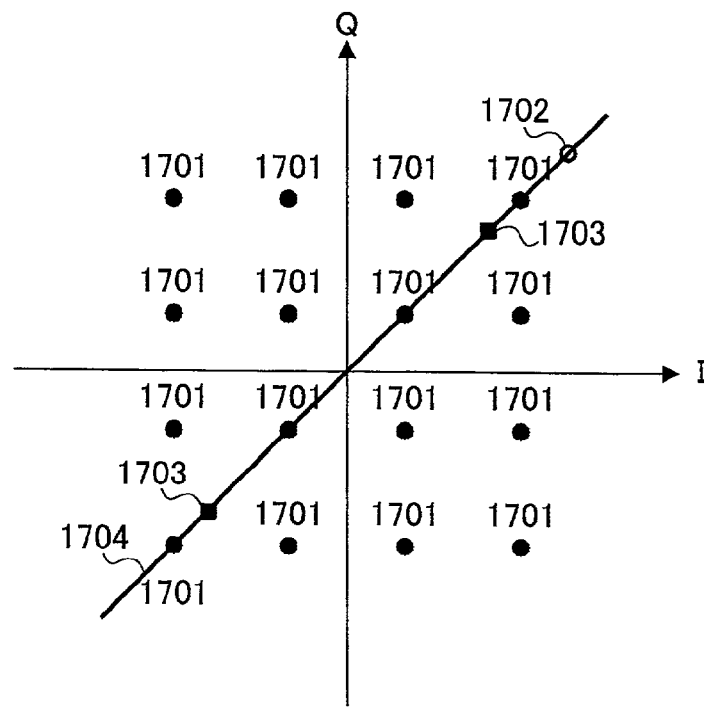
FIG. 17 is a view showing an example of a signal space diagram on the in-phase(I)-quadrature (Q) plane of 16QAM in the digital radio communication system according to the third embodiment of the present invention.

FIG. 17 shows a signal space diagram on the in-phase(I)-quadrature (Q) plane of 16QAM to indicate a signal point of a pilot symbol and signal points of each symbol immediately before or after the pilot symbol. In FIG. 17, reference numerals 1701 denote signal points of a 16QAM modulated signal, reference numeral 1702 denotes a signal point of the pilot symbol, and reference numerals 1703 denote signal points of each symbol immediately before or after the pilot symbol. Further, reference numeral 1704 denotes a virtual line connecting the signal point of the pilot symbol and the origin on the I-Q plane. With respect to each symbol immediately before of after the pilot symbol, at least two signal points 1703 are arranged on the ideal line 1704.

Figure 18:
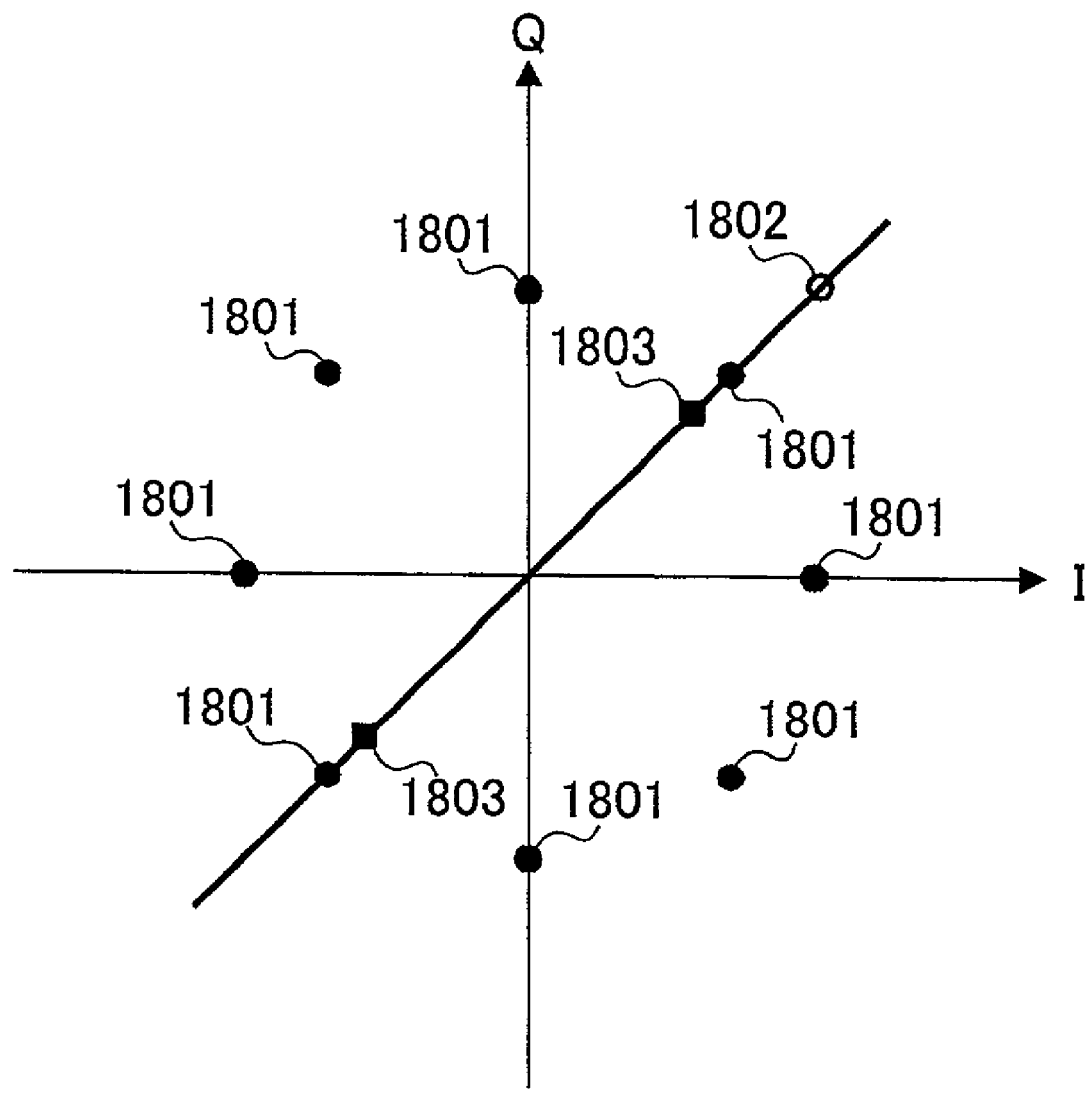
FIG. 18 is a view showing an example of a signal space diagram on the in-phase(I)-quadrature (Q) plane of 8PSK in the digital radio communication system according to the third embodiment of the present invention.

FIG. 18 shows a signal space diagram on the in-phase(I)-quadrature (Q) plane of 8PSK to indicate a signal point of a pilot symbol and signal points of each symbol immediately before or after the pilot symbol. In FIG. 18, reference numerals 1801 denote signal points of an 8PSK modulated signal, reference numeral 1802 denotes a signal point of the pilot symbol, and reference numerals 1803 denote signal points of each symbol immediately before or after the pilot symbol. Further, reference numeral 1804 denotes a virtual line connecting the signal point of the pilot symbol and the origin on the I-Q plane. With respect to each symbol immediately before of after the pilot symbol, at least two signal points 1803 are arranged on the ideal line 1804.

Thus, in the third embodiment, in the digital radio communication system and schemes, a signal modulation scheme on downlink is determined corresponding to propagation environments from at least two kinds of modulation schemes including the multi-level modulation scheme with the modulation level of 16 or more where the amplitude is provided with information, while a signal modulation scheme on uplink is determined corresponding to propagation environments from at least two kinds of phase modulation schemes. Further, in a frame structure in which one pilot symbol is inserted in every three or more successive information symbols, the number of signal points of each of a symbol immediately before the pilot symbol and another symbol immediately after the pilot symbol is two or more, and is less than the number of signal points of each of other information symbols.

Thus, in the quasi-coherent detection on a symbol of which the symbol synchronization is not completely acquired, it is possible to suppress the deterioration in accuracy in estimating a frequency offset amount, and therefore the bit error rate can be improved in carrier to noise ratio.

Further, as compared to a case that three pilot symbols are inserted successively, it is possible to suppress the deterioration in data transmission efficiency.

In addition, a position arrangement of signal points of a symbol immediately before or after a pilot symbol is not limited in particular to the arrangement in which at least two points are arranged on the virtual line connecting the signal point of the pilot symbol and the origin on the in-phase(I)-quadrature (Q) plane, and any arrangements are applicable where the number of signal points of the symbol immediately before or after the pilot symbol is less than the number of signal points of each of other information symbols. Further, there is a case that the pilot symbol is not inserted depending on the modulation scheme of information symbol. Then, by changing the number of signal points of the symbol immediately before or after the pilot symbol corresponding to the switching of modulation schemes, it is possible to control the information quality and transmission efficiency flexibly.

As described above, according to the present invention, in the digital radio communication system and schemes, when modulation schemes are switched corresponding to propagation environments and further, different modulation schemes are used between uplink and downlink, it is made possible to use on downlink a modulation scheme with a higher data transmission rate, while using a phase modulation scheme as the modulation scheme on uplink, and it is thereby possible to obtain both improved data transmission rate and the benefit and convenience in terminals.

The present invention is not limited to the above described embodiments, and various variations and modifications may be possible without departing from the scope of the present invention.

This application is based on the Japanese Patent Applications No. 2000-048856 filed on Feb. 25, 2000 and No. 2000-320627 filed on Oct. 20, 2000, entire contents of which are expressly incorporated by reference herein.

What is claimed is:

1. A base station apparatus, comprising:
    a transmitter that transmits transmission data to a terminal apparatus; and
    a modulator that modulates the transmitted transmission data with a modulation scheme corresponding to a propagation environment, said transmitted transmission data being modulated with a modulation scheme determined from at least two types of modulation schemes including a multi-level modulation scheme with a modulation level of at least 16 where amplitude is provided with information, said base station receiving, from the terminal apparatus, transmission data modulated with a modulation scheme corresponding to the propagation environment, the received transmission data being modulated with a modulation scheme determined from at least two types of phase modulation schemes,
    wherein each of a number of signal points of a symbol immediately before a pilot symbol and a number of signal points of another symbol immediately after the pilot symbol is at least two, and is less than the number of signal points of each of other information symbols, when said base station modulates the transmission data with the multi-level modulation scheme and transmits the data in a frame structure in which a pilot symbol comprising a single symbol is inserted in every three or more successive information symbols.

2. A base station, comprising:
    a transmitter that transmits transmission data to a terminal apparatus; and
    a modulator that modulates the transmitted transmission data with a modulation scheme corresponding to a propagation environment, said transmitted transmission data being modulated with a modulation scheme determined from at least two types of modulation schemes including a multi-level modulation scheme with a modulation level of at least 16 where amplitude is provided with information, said base station receiving, from the terminal apparatus, transmission data modulated with a modulation scheme corresponding to the propagation environment, the received transmission data being modulated with a modulation scheme determined from at least two types of phase modulation schemes,
    wherein each of a number of signal points of a symbol immediately before a pilot symbol and a number of signal points of another symbol immediately after the pilot symbol is at least two, and is less than the number of signal points of each of other information symbols, when said base station modulates the transmission data with 8PSK and transmits the data in a frame structure in which a pilot symbol comprising a single symbol is inserted in every three or more successive information symbols.

3. A terminal apparatus, comprising:
    a transmitter that transmits transmission data to a base station; and
    a modulator that modulates the transmitted transmission data with a modulation scheme corresponding to a propagation environment, said transmitted transmission data being modulated with a modulation scheme determined from at least two types of phase modulation schemes, said terminal apparatus receiving, from the base station, transmission data modulated with a modulation scheme corresponding to the propagation environment, the received transmission data being modulated with a modulation scheme determined from at least two types of modulation schemes including a multi-level modulation scheme with a modulation level of at least 16 where amplitude is provided with information,
    wherein each of a number of signal points of a symbol immediately before a pilot symbol and a number of signal points of another symbol immediately after the pilot symbol is two or more, and is less than the number of signal points of each of other information symbols, when said terminal apparatus modulates the transmission data with 8PSK and transmits the data in a frame structure in which a pilot symbol is inserted in every three or more successive information symbols.

* * * * *